(12) United States Patent
Yang

(10) Patent No.: US 12,195,974 B2
(45) Date of Patent: *Jan. 14, 2025

(54) ROOFING SYSTEMS AND RELATED METHODS

(71) Applicant: BMIC LLC, Dallas, TX (US)

(72) Inventor: Li-Ying Yang, Whippany, NJ (US)

(73) Assignee: BMIC LLC, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/506,481

(22) Filed: Nov. 10, 2023

(65) Prior Publication Data

US 2024/0084598 A1 Mar. 14, 2024

Related U.S. Application Data

(63) Continuation of application No. 17/897,852, filed on Aug. 29, 2022, now Pat. No. 11,834,836, which is a continuation of application No. 17/486,392, filed on Sep. 27, 2021, now Pat. No. 11,428,008.

(60) Provisional application No. 63/083,548, filed on Sep. 25, 2020.

(51) Int. Cl.
| | | |
|---|---|---|
| *E04D 5/10* | (2006.01) | |
| *B32B 7/12* | (2006.01) | |
| *B32B 27/08* | (2006.01) | |
| *E04D 5/06* | (2006.01) | |
| *B32B 27/30* | (2006.01) | |
| *B32B 27/32* | (2006.01) | |
| *B32B 27/36* | (2006.01) | |

(52) U.S. Cl.
CPC .................. *E04D 5/10* (2013.01); *B32B 7/12* (2013.01); *B32B 27/08* (2013.01); *E04D 5/06* (2013.01); *B32B 27/304* (2013.01); *B32B 27/32* (2013.01); *B32B 27/36* (2013.01); *B32B 2250/04* (2013.01); *B32B 2307/7265* (2013.01); *B32B 2307/732* (2013.01); *B32B 2307/748* (2013.01); *B32B 2419/06* (2013.01)

(58) Field of Classification Search
CPC .... E04D 5/00; E04D 5/06; E04D 5/08; E04D 5/10; E04D 5/14; E04D 5/148
See application file for complete search history.

(56) References Cited

U.S. PATENT DOCUMENTS

| | | |
|---|---|---|
| 6,106,941 A | 8/2000 | Fisher et al. |
| 7,368,155 B2 | 5/2008 | Larson et al. |
| 7,651,780 B2 | 1/2010 | Yang |
| 7,900,413 B2 | 3/2011 | Stanley |
| 7,914,868 B2 | 3/2011 | Naipawer, III et al. |
| 8,241,446 B2 | 8/2012 | Naipawer, III et al. |

(Continued)

FOREIGN PATENT DOCUMENTS

WO 2019/106117 A1 6/2019

*Primary Examiner* — Zachary M Davis
(74) *Attorney, Agent, or Firm* — GREENBERG TRAURIG, LLP

(57) ABSTRACT

Some embodiments of the present disclosure relate to a roofing system. In some embodiments, the roofing system includes a roofing membrane, which may include a cap, a scrim, and a core. In some embodiments, the roofing system may also include an adhesive film, which may include a first adhesive layer adhered to the roofing membrane, a second adhesive layer configured to adhere the roofing membrane to a roofing substrate, and a barrier layer positioned between the first and second adhesive layers. Methods of manufacturing roofing systems are also disclosed.

19 Claims, 10 Drawing Sheets

(56) References Cited

U.S. PATENT DOCUMENTS

| | | |
|---|---|---|
| 8,313,597 B2 | 11/2012 | Yang et al. |
| 8,769,903 B2 | 7/2014 | Svec |
| 8,834,993 B2 | 9/2014 | Yang |
| 9,103,122 B2 | 8/2015 | Boss |
| 9,611,647 B2 | 4/2017 | Yang |
| 10,392,808 B2 | 8/2019 | Barksdale et al. |
| 10,731,057 B2 | 8/2020 | Scanish |
| 11,428,008 B2 | 8/2022 | Yang |
| 2007/0194482 A1 | 8/2007 | Douglas et al. |
| 2009/0320987 A1 | 12/2009 | Hubbard et al. |
| 2013/0065020 A1 | 3/2013 | Loftus et al. |
| 2016/0230392 A1 | 8/2016 | Tang et al. |
| 2017/0306628 A1 | 10/2017 | Simonis et al. |

ROOFING SYSTEMS AND RELATED METHODS

CROSS-REFERENCE TO RELATED APPLICATIONS

This application is a continuation of U.S. patent application Ser. No. 17/897,852, filed on Aug. 29, 2022, entitled "ROOFING SYSTEMS AND RELATED METHODS," which is a continuation of U.S. patent application Ser. No. 17/486,392, filed on Sep. 27, 2021, entitled "ROOFING SYSTEMS AND RELATED METHODS", which claims priority to U.S. Provisional Application No. 63/083,548, filed on Sep. 25, 2020, entitled "SELF-ADHERED ROOFING SYSTEMS AND METHODS," which are herein incorporated by reference in their entirety.

FIELD

The present disclosure relates to roofing systems and related methods.

BACKGROUND

Traditional self-adhered roofing membranes are formed in a two-step process. First, the roofing membrane is manufactured in a factory. An adhesive is subsequently coated to the back of the roofing membrane, in a second process step, at a separate production line. After the adhesive cures on the roofing membrane, the roofing membrane may be deployed for field installation.

SUMMARY

Covered embodiments are defined by the claims, not this summary. This summary is a high-level overview of various aspects and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

Some embodiments relate to a roofing system including: a roofing substrate; a roofing membrane, wherein the roofing membrane includes: a cap layer, a core layer, and a scrim between the cap layer and the core layer; wherein the roofing membrane includes at least one of: a thermoplastic polyolefin (TPO), a polyvinyl chloride (PVC), or any combination thereof; and an adhesive film, wherein the adhesive film includes: a first adhesive layer, wherein the first adhesive layer is adhered to the core layer of the roofing membrane; a second adhesive layer, wherein the second adhesive layer is adhered to the roofing substrate; wherein the second adhesive layer is different from the first adhesive layer; and a barrier layer, wherein the barrier layer is positioned between the first adhesive layer and the second adhesive layer; wherein the barrier layer is adhered to the first adhesive layer; wherein the barrier layer is adhered to the second adhesive layer; wherein a peel strength between the barrier layer and the roofing substrate is 2 PLI to 15 PLI as measured according to ASTM D413; wherein the barrier layer includes at least one of a thermoplastic polyolefin (TPO), a polyethylene terephthalate (PET), a polypropylene (PP), a PET fabric reinforcement, a polyurethane, or any combination thereof.

In some embodiments, the roofing substrate includes at least one of a cover board, a mat, or any combination thereof.

In some embodiments, the roofing substrate is a low slope roofing substrate disposed on a roof having a pitch of Y/X, where Y/X are a ratio of less than 4:12.

In some embodiments, the first adhesive layer includes a non-polar adhesive material, wherein the second adhesive layer includes a polar adhesive material.

In some embodiments, the first adhesive layer and the second adhesive layer each independently include at least one of an epoxy adhesive, a polyurethane adhesive, an acrylic adhesive, an ultraviolet radiation cured adhesive, a silicone-containing adhesive, a silyl modified polymer, a silane terminated polymer, natural rubber, a polyolefin polymer, a poly-alpha-olefin (APAO/APO) polymer, a polyamide polyvinyl acetate, a poly vinyl acetate, a polyvinyl alcohol, an ethylene vinyl acetate, a styrene, a styrene-isoprene-styrene (SIS) polymer, a styrene-butadiene-styrene (SBS) polymer, a styrene-ethylene/butylene-styrene (SEBS) polymer, a styrene-butadiene rubber (SBR), a polyamide, a polyester, a polyester amide, an ethylene acrylic, a butyl rubber, or any combination thereof.

In some embodiments, the first adhesive layer includes at least one of a polyolefin polymer, a poly-alpha-olefin (APAO/APO) polymer, a butyl rubber, a styrene-isoprene-styrene (SIS) polymer, a styrene-butadiene-styrene (SBS) polymer, a styrene-ethylene/butylene-styrene (SEBS) polymer, a styrene-butadiene rubber (SBR), or any combination thereof.

In some embodiments, the first adhesive layer includes at least one of an acrylic adhesive, a polyurethane adhesive, a silane terminated polymer, or any combination thereof.

In some embodiments, the second adhesive layer includes at least one of ethylene vinyl acetate, poly vinyl acetate, an acrylic adhesive, or any combination thereof.

In some embodiments, a peel strength between the barrier layer and the roofing membrane is 2 PLI to 15 PLI as measured according to ASTM D413.

In some embodiments, when tested with the second adhesive layer between the barrier layer and the roofing membrane, a peel strength between the barrier layer and the roofing membrane is less than a peel strength having the first adhesive layer between the barrier layer and the roofing membrane.

In some embodiments, a thickness of the first adhesive layer or the second adhesive layer is 1 mil to 10 mil.

Some embodiments relate to a roofing membrane including: a roofing membrane, wherein the roofing membrane includes: a cap layer, a core layer, and a scrim between the cap layer and the core layer; wherein the roofing membrane includes at least one of: a thermoplastic polyolefin (TPO), a polyvinyl chloride (PVC), or any combination thereof; and an adhesive film, wherein the adhesive film includes: a first adhesive layer, wherein the first adhesive layer is adhered to the core layer of the roofing membrane; a second adhesive layer, wherein the second adhesive layer is configured to adhere to a roofing substrate; wherein the second adhesive layer is different from the first adhesive layer; and a barrier layer, wherein the barrier layer is positioned between the first adhesive layer and the second adhesive layer; wherein the barrier layer is adhered to the first adhesive layer; wherein the barrier layer is adhered to the second adhesive layer; wherein a peel strength between the barrier layer and the roofing membrane is 2 PLI to 15 PLI as measured according to ASTM D413; wherein the barrier layer includes at least one of a thermoplastic polyolefin (TPO), a polyethylene terephthalate (PET), a polypropylene (PP), a PET fabric reinforcement, a polyurethane, or any combination thereof.

In some embodiments, the first adhesive layer includes a non-polar adhesive material, wherein the second adhesive layer includes a polar adhesive material.

In some embodiments, the first adhesive layer and the second adhesive layer each independently include at least one of an epoxy adhesive, a polyurethane adhesive, an acrylic adhesive, an ultraviolet radiation cured adhesive, a silicone-containing adhesive, a silyl modified polymer, a silane terminated polymer, natural rubber, a polyolefin polymer, a poly-alpha-olefin (APAO/APO) polymer, a polyamide polyvinyl acetate, a poly vinyl acetate, a polyvinyl alcohol, an ethylene vinyl acetate, a styrene, a styrene-isoprene-styrene (SIS) polymer, a styrene-butadiene-styrene (SBS) polymer, a styrene-ethylene/butylene-styrene (SEBS) polymer, a styrene-butadiene rubber (SBR), a polyamide, a polyester, a polyester amide, an ethylene acrylic, a butyl rubber, or any combination thereof.

In some embodiments, the first adhesive layer includes at least one of a polyolefin polymer, a poly-alpha-olefin (APAO/APO) polymer, a butyl rubber, a styrene-isoprene-styrene (SIS) polymer, a styrene-butadiene-styrene (SBS) polymer, a styrene-ethylene/butylene-styrene (SEBS) polymer, a styrene-butadiene rubber (SBR), or any combination thereof.

In some embodiments, the first adhesive layer includes at least one of an acrylic adhesive, a polyurethane adhesive, a silane terminated polymer, or any combination thereof.

In some embodiments, the second adhesive layer includes at least one of ethylene vinyl acetate, poly vinyl acetate, an acrylic adhesive, or any combination thereof.

In some embodiments, when tested with the second adhesive layer between the barrier layer and the roofing membrane, a peel strength between the barrier layer and the roofing membrane is less than a peel strength having the first adhesive layer between the barrier layer and the roofing membrane.

In some embodiments, a thickness of the first adhesive layer or the second adhesive layer is 1 mil to 10 mil.

In some embodiments, the roofing system further includes a protective liner removably attached to the second adhesive layer of the adhesive film.

DRAWINGS

Some embodiments of the disclosure are herein described, by way of example only, with reference to the accompanying drawings. With specific reference now to the drawings in detail, it is stressed that the embodiments shown are by way of example and for purposes of illustrative discussion of embodiments of the disclosure. In this regard, the description taken with the drawings makes apparent to those skilled in the art how embodiments of the disclosure may be practiced.

DETAILED DESCRIPTION

Figure 1:
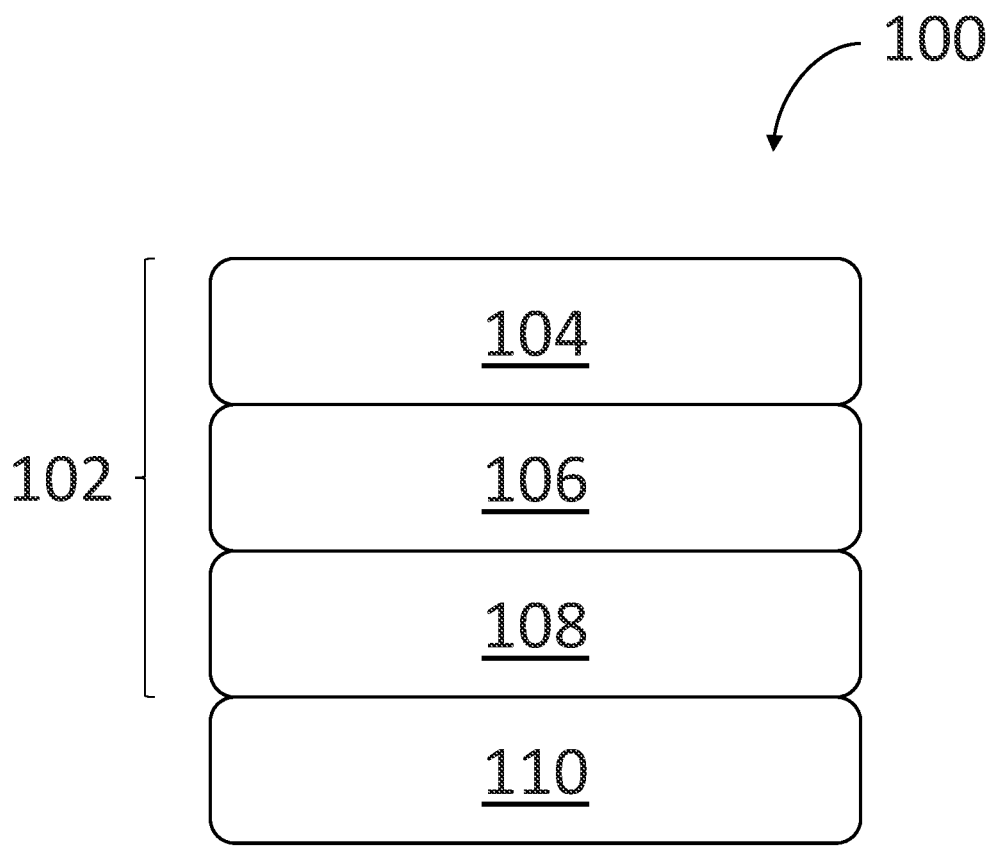
FIG. 1 is a cross-sectional view of a roofing system, according to some embodiments of the present disclosure.

Among those benefits and improvements that have been disclosed other objects and advantages of this disclosure will become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given regarding the various embodiments of the disclosure are intended to be illustrative, and not restrictive.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though it may. Furthermore, the phrases "in another embodiment" and "in some other embodiments" as used herein do not necessarily refer to a different embodiment, although it may. All embodiments of the disclosure are intended to be combinable without departing from the scope or spirit of the disclosure.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, terms such as "comprising" "including," and "having" do not limit the scope of a specific claim to the materials or steps recited by the claim.

As used herein, the term "consisting essentially of" limits the scope of a specific claim to the specified materials or steps and those that do not materially affect the basic and novel characteristic or characteristics of the specific claim.

As used herein, terms such as "consisting of" and "composed of" limit the scope of a specific claim to the materials and steps recited by the claim.

All prior patents, publications, and test methods referenced herein are incorporated by reference in their entireties.

Some embodiments of the present disclosure relate to a roofing system. In some embodiments, the roofing system may comprise, consist of, or consist essentially of at least one of a roofing membrane, an adhesive film, a roofing substrate, or any combination thereof. In some embodiments, the roofing membrane may be a self-adhering roofing membrane. In some embodiments, the self-adhering roofing membrane may comprise, consist of, or consist essentially of at least one of a roofing membrane, an adhesive film, or any combination thereof.

In some embodiments, the roofing system may include a roofing membrane. In some embodiments, the roofing membrane may comprise, consist of, or consist essentially of one or more material layers. In some embodiments, the one or more material layers may comprise, consist of, or consist essentially of at least one of an extruded material layer, a co-extruded material layer, a laminated material layer, a coated material layer, or any combination thereof. In some embodiments, the one or more material layers may be integrally connected (e.g., intimately adhered or intimately bonded) to each other to form a single-layer membrane material, such as, for example, a single ply roofing membrane. In some embodiments, for example, the single layer membrane material may comprise, consist of, or consist essentially of a layer of a single homogenous material. In some embodiments, the single layer membrane material may comprise, consist of, or consist essentially of a layer of a single composite material.

In some embodiments, the one or more material layers of the roofing membrane may independently comprise, consist of, or consist essentially of at least one of thermoplastic polyolefins (TPO), polyvinyl chlorides (PVC), cyclopiazonic acid (CPA), chlorinated polyethylene resins (CPE), ethylene interpolymers (EIP), nitrile butadiene polymers (NBP), polyisobutylenes (PIB), atactic-polypropylene (APP), APP-modified bitumen, poly(styrene-butadiene-styrene) (SBS), styrene ethylene butylene styrene (SEBS), ethylene propylene diene monomers (EDPM), chlorosulfonated polyethylene rubbers (CSPE), polychloroprene (CR), extracellular region membranes (ECR), polycarbonate, nylon, polyvinyl acetate, polystyrene, polytetrafluoroethylene, polyvinylidene fluoride (PVDF), polyurethane, epoxy, or any combination thereof.

In some embodiments, the roofing membrane may be a single-ply sheet of material that may be configured to adhere to a roofing substrate. In some embodiments, the roofing membrane may be made of a synthetic material. In some embodiments, the synthetic material may include ethelyne propylene diene monomer (EPDM), cholorosulfonated polyethylene (CSPE), TPO, PVC, or any combination thereof. In some embodiments, the roofing membrane may be a singly ply EPDM roofing membrane, a single ply CSPE roofing membrane, a single ply TPO roofing membrane, or a single ply PVC roofing membrane. The roofing membrane may further include one or more layers of material. In some embodiments, the layers of the roofing membrane may include a cap layer, a scrim, and a core layer. In some embodiments, the cap layer may comprise, consist of, or consist essentially of at least one of an extruded cap layer, a co-extruded cap layer, a laminated cap layer, a coated cap layer, or any combination thereof. In some embodiments, the core layer may comprise, consist of, or consist essentially of at least one of an extruded core layer, a co-extruded core layer, a laminated core layer, a coated core layer, or any combination thereof.

In some embodiments, the roofing system may also include an adhesive film, which may include one or more layers. In some embodiments, the one or more layers may comprise at least one of the following: one or more adhesive layers, one or more non-adhesive layers, or any combination thereof. In some embodiments, the one or more adhesive layers may comprise, consist of, or consist essentially of one or more adhesives. In some embodiments, the one or more non-adhesive layers may not comprise any adhesives. In some embodiments, the one or more adhesive layers may comprise, consist of, or consist essentially of at least one of an extruded layer, a coextruded layer, a coated layer, a laminated layer, or any combination thereof. In some embodiments, the one or more non-adhesive layers may comprise, consist of, or consist essentially of at least one of an extruded layer, a coextruded layer, a coated layer, a laminated layer, or any combination thereof.

In some embodiments, the adhesive film may include at least three layers, including a first layer, a second layer and a barrier layer.

In some embodiments, the first layer of the adhesive film may be a first adhesive layer, which may be configured to adhere to the roofing membrane. In some embodiments, for example, the first adhesive layer may comprise a first adhesive that is adhered to the core layer of the roofing membrane. In some embodiments, a strength of the adhesion between the first adhesive layer and the roofing membrane may be greater than 2 PLI 180° peel when tested at 2"/min pulling speed in accordance with ASTM D413. In some embodiments, the first adhesive layer may include non-polar adhesive materials such as polyolefin polymer, poly-alpha-olefin (APAO/APO) polymer, Butyl, a styrene-isoprene-styrene polymer (SIS), a styrene-butadiene-styrene polymer (SBS), a styrene-ethylene/butylene-styrene polymer (SEBS), and/or a styrene-butadiene rubber (SBR), or any combinations thereof. In some embodiments, the first adhesive layer may also include acrylic, polyurethane, silane terminated polymer, or any combinations thereof. In some embodiments, the first adhesive layer is not a liquid adhesive.

In some embodiments, the first adhesive layer has a thickness of 1 mil to 10 mil. In some embodiments, the first adhesive layer has a thickness of 2 mil to 10 mil. In some embodiments, the first adhesive layer has a thickness of 3 mil to 10 mil. In some embodiments, the first adhesive layer has a thickness of 4 mil to 10 mil. In some embodiments, the first adhesive layer has a thickness of 5 mil to 10 mil. In some embodiments, the first adhesive layer has a thickness of 6 mil to 10 mil. In some embodiments, the first adhesive layer has a thickness of 7 mil to 10 mil. In some embodiments, the first adhesive layer has a thickness of 8 mil to 10 mil. In some embodiments, the first adhesive layer has a thickness of 9 mil to 10 mil. In some embodiments, the first adhesive layer has a thickness of 1 mil to 9 mil. In some embodiments, the first adhesive layer has a thickness of 1 mil to 8 mil. In some embodiments, the first adhesive layer has a thickness of 1 mil to 7 mil. In some embodiments, the first adhesive layer has a thickness of 1 mil to 6 mil. In some embodiments, the first adhesive layer has a thickness of 1 mil to 5 mil. In some embodiments, the first adhesive layer has a thickness of 1 mil to 4 mil. In some embodiments, the first adhesive layer has a thickness of 1 mil to 3 mil. In some embodiments, the first adhesive layer has a thickness of 1 mil to 2 mil. In some embodiments, the first adhesive layer has a thickness between approximately 2 mil and 9 mil. In some embodiments, the first adhesive layer has a thickness between approximately, 3 mil and 8 mil. In some embodiments, the first adhesive layer has a thickness between approximately 4 mil and 7 mil.

In some embodiments, the first adhesive layer may comprise, consist of, or consist essentially of a first adhesive that is sufficient to adhere the first adhesive film to the roofing membrane (e.g., the core layer of the roofing membrane). In some embodiments, the peel strength between the barrier layer and the roofing membrane is 2 pounds per linear inch (PLI) to 15 PLI. In some embodiments, the peel strength between the barrier layer and the roofing membrane, with the second adhesive layer being positioned therebetween (e.g., in place of the first adhesive layer), would be less than the peel strength between the barrier layer and the roofing membrane, with the first adhesive layer positioned therebetween. For example, the peel strength between the barrier layer and the roofing membrane, with the second adhesive layer being positioned between the barrier layer and the roofing membrane (e.g., in place of the first adhesive layer), would be less than the peel strength between the barrier layer and the roofing membrane, with the first adhesive layer positioned between the barrier layer and the roofing membrane, where the roofing membrane comprises polyvinyl chloride (PVC). In some embodiments, the peel strength between the barrier layer and the roofing membrane is 2 PLI to 14 PLI. In some embodiments, the peel strength between the barrier layer and the roofing membrane is 2 PLI to 13 PLI. In some embodiments, the peel strength between the barrier layer and the roofing membrane is 2 PLI to 12 PLI. In some embodiments, the peel strength between the barrier layer and the roofing membrane is 2 PLI to 11 PLI. In some embodiments, the peel strength between the barrier layer and the roofing membrane is 2 PLI to 10 PLI. In some embodiments, the peel strength between the barrier layer and the roofing membrane is 2 PLI to 9 PLI. In some embodiments, the peel strength between the barrier layer and the roofing membrane is 2 PLI to 8 PLI. In some embodiments, the peel strength between the barrier layer and the roofing membrane is 2 PLI to 7 PLI. In some embodiments, the peel strength between the barrier layer and the roofing membrane is 2 PLI to 6 PLI. In some embodiments, the peel strength between the barrier layer and the roofing membrane is 2 PLI to 5 PLI. In some embodiments, the peel strength between the barrier layer and the roofing membrane is 2 PLI to 4 PLI. In some embodiments, the peel strength between the barrier layer and the roofing membrane is 2 PLI to 3 PLI. In some embodiments, the peel strength between the barrier layer and the roofing membrane is 3 PLI to 15 PLI. In some embodiments, the peel strength between the barrier layer and the roofing membrane is 4 PLI to 15 PLI. In some embodiments, the peel strength between the barrier layer and the roofing membrane is 5 PLI to 15 PLI. In some embodiments, the peel strength between the barrier layer and the roofing membrane is 6 PLI to 15 PLI. In some embodiments, the peel strength between the barrier layer and the roofing membrane is 7 PLI to 15 PLI. In some embodiments, the peel strength between the barrier layer and the roofing membrane is 8 PLI to 15 PLI. In some embodiments, the peel strength between the barrier layer and the roofing membrane is 9 PLI to 15 PLI. In some embodiments, the peel strength between the barrier layer and the roofing membrane is 10 PLI to 15 PLI. In some embodiments, the peel strength between the barrier layer and the roofing membrane is 11 PLI to 15 PLI. In some embodiments, the peel strength between the barrier layer and the roofing membrane is 12 PLI to 15 PLI. In some embodiments, the peel strength between the barrier layer and the roofing membrane is 13 PLI to 15 PLI. In some embodiments, the peel strength between the barrier layer and the roofing membrane is 14 PLI to 15 PLI. In some embodiments, the PLI is measured by a 180° peel at a 2"/min pulling speed in accordance with ASTM D413.

In some embodiments, the first adhesive of the first adhesive layer may be configured to adhere to a low surface energy material. In some embodiments, for example, the first adhesive may be configured to adhere to a surface having a surface energy of less than 36 dynes/cm. In some embodiments, the first adhesive of the first adhesive layer may be configured to adhere to a surface having a surface energy of 1 dyne/cm to 36 dynes/cm.

In some embodiments, the second layer of the adhesive film may be a second adhesive layer, which may be configured to adhere the roofing membrane to a roofing substrate. In some embodiments, for example, the second adhesive layer may comprise a second adhesive that is adhered to the roofing substrate. In some embodiments, the roofing substrate may be any suitable substrate known to those skilled in the art upon which a roofing membrane may be applied, including a deck, polyisocyanurate insulation foam, or DensDeck® Cover Gypsum boards, or any combinations thereof. In some embodiments, a strength of the adhesion between the second adhesive layer and the roofing substrate may be greater than 2 PLI 180° peel when tested at 2"/min pulling speed in accordance with ASTM D413. In some embodiments, the second adhesive layer may be configured to adhere to the first adhesive layer. In some embodiments, the second adhesive layer may be made of one or more materials that are different from the first adhesive layer. For example, in some embodiments, the second adhesive layer may include polar adhesives such as ethylene vinyl acetate, acrylic adhesives, or any combinations thereof. In some embodiments, the second adhesive layer is not a liquid adhesive. In some embodiments, the first adhesive layer and the second adhesive layer are not liquid adhesives.

In some embodiments, the second adhesive layer has a thickness of 1 mil to 10 mil. In some embodiments, the second adhesive layer has a thickness of 2 mil to 10 mil. In some embodiments, the second adhesive layer has a thickness of 3 mil to 10 mil. In some embodiments, the second adhesive layer has a thickness of 4 mil to 10 mil. In some embodiments, the second adhesive layer has a thickness of 5 mil to 10 mil. In some embodiments, the second adhesive layer has a thickness of 6 mil to 10 mil. In some embodiments, the second adhesive layer has a thickness of 7 mil to 10 mil. In some embodiments, the second adhesive layer has a thickness of 8 mil to 10 mil. In some embodiments, the second adhesive layer has a thickness of 9 mil to 10 mil. In some embodiments, the second adhesive layer has a thickness of 1 mil to 9 mil. In some embodiments, the second adhesive layer has a thickness of 1 mil to 8 mil. In some embodiments, the second adhesive layer has a thickness of 1 mil to 7 mil. In some embodiments, the second adhesive layer has a thickness of 1 mil to 6 mil. In some embodiments, the second adhesive layer has a thickness of 1 mil to 5 mil. In some embodiments, the second adhesive layer has a thickness of 1 mil to 4 mil. In some embodiments, the second adhesive layer has a thickness of 1 mil to 3 mil. In some embodiments, the second adhesive layer has a thickness of 1 mil to 2 mil. In some embodiments, the second adhesive layer has a thickness between approximately 2 mil and 9 mil. In some embodiments, the second adhesive layer has a thickness between approximately, 3 mil and 8 mil. In some embodiments, the second adhesive layer has a thickness between approximately 4 mil and 7 mil.

In some embodiments, the second adhesive layer may comprise, consist of, or consist essentially of an adhesive that is sufficient to adhere the second adhesive film to the roofing substrate. In some embodiments, the peel strength between the barrier layer and the roofing substrate is 2 PLI to 15 PLI. In some embodiments, the peel strength between the barrier layer and the roofing substrate is 2 PLI to 14 PLI. In some embodiments, the peel strength between the barrier layer and the roofing substrate is 2 PLI to 13 PLI. In some embodiments, the peel strength between the barrier layer and the roofing substrate is 2 PLI to 12 PLI. In some embodiments, the peel strength between the barrier layer and the roofing substrate is 2 PLI to 11 PLI. In some embodiments, the peel strength between the barrier layer and the roofing substrate is 2 PLI to 10 PLI. In some embodiments, the peel strength between the barrier layer and the roofing substrate is 2 PLI to 9 PLI. In some embodiments, the peel strength between the barrier layer and the roofing substrate is 2 PLI to 8 PLI. In some embodiments, the peel strength between the barrier layer and the roofing substrate is 2 PLI to 7 PLI. In some embodiments, the peel strength between the barrier layer and the roofing substrate is 2 PLI to 6 PLI. In some embodiments, the peel strength between the barrier layer and the roofing substrate is 2 PLI to 5 PLI. In some embodiments, the peel strength between the barrier layer and the roofing substrate is 2 PLI to 4 PLI. In some embodiments, the peel strength between the barrier layer and the roofing substrate is 2 PLI to 3 PLI. In some embodiments, the peel strength between the barrier layer and the roofing substrate is 3 PLI to 15 PLI. In some embodiments, the peel strength between the barrier layer and the roofing substrate is 4 PLI to 15 PLI. In some embodiments, the peel strength between the barrier layer and the roofing substrate is 5 PLI to 15 PLI. In some embodiments, the peel strength between the barrier layer and the roofing substrate is 6 PLI to 15 PLI. In some embodiments, the peel strength between the barrier layer and the roofing substrate is 7 PLI to 15 PLI. In some embodiments, the peel strength between the barrier layer and the roofing substrate is 8 PLI to 15 PLI. In some embodiments, the peel strength between the barrier layer and the roofing substrate is 9 PLI to 15 PLI. In some embodiments, the peel strength between the barrier layer and the roofing substrate is 10 PLI to 15 PLI. In some embodiments, the peel strength between the barrier layer and the roofing substrate is 11 PLI to 15 PLI. In some embodiments, the peel strength between the barrier layer and the roofing substrate is 12 PLI to 15 PLI. In some embodiments, the peel strength between the barrier layer and the roofing substrate is 13 PLI to 15 PLI. In some embodiments, the peel strength between the barrier layer and the roofing substrate is 14 PLI to 15 PLI. In some embodiments, the PLI is measured by a 180° peel at a 2"/min pulling speed in accordance with ASTM D413.

In some embodiments, the second adhesive of the second adhesive layer may be configured to adhere to a medium surface energy material. In some embodiments, for example, the second adhesive may be configured to adhere to a surface having a surface energy of 36 dynes/cm or greater. In some embodiments, the second adhesive of the second adhesive layer may be configured to adhere to a surface having a surface energy of 36 dynes/cm to 300 dynes/cm. In some embodiments, the second adhesive of the second adhesive layer may be configured to adhere to a high surface energy material. In some embodiments, for example, the second adhesive may be configured to adhere to a surface having a surface energy of greater than 300 dynes/cm. In some embodiments, the second adhesive of the second adhesive layer may be configured to adhere to a surface having a surface energy of greater than 300 dynes/cm to 500 dynes/cm.

In some embodiments, the first adhesive layer is different from the second adhesive layer. In some embodiments, the first adhesive layer comprises a first adhesive. In some embodiments, the second adhesive layer comprises a second adhesive. In some embodiments, the second adhesive is different from the first adhesive.

In some embodiments, the first adhesive layer comprises an adhesive with an adhesion strength sufficient to adhere the adhesive film to the core layer. In some embodiments, the second adhesive layer comprises an adhesive with an adhesion strength sufficient to adhere the adhesive film to the roofing substrate. In some embodiments, the adhesion strength of the second adhesive layer is or would be insufficient to adhere the adhesive film to the roofing membrane.

In some embodiments, the barrier layer of the adhesive film may be a non-adhesive layer. In some embodiments, for example, the barrier layer may not comprise adhesive. In some embodiments, the barrier layer may be positioned between the roofing membrane and the first layer. In some embodiments, the barrier layer may be positioned between the first layer and the second layer. In some embodiments, for example, the barrier layer may be positioned between the first adhesive layer and the second adhesive layer. In some embodiments, the barrier layer is adhered to the first adhesive layer. In some embodiments, the barrier layer is adhered to the second adhesive layer.

In some embodiments, the barrier layer may include any suitable material known to those skilled in the art that may facilitate adhering of the first adhesive layer to the barrier layer and that may facilitate adhering of the second adhesive layer to the barrier layer. In some embodiments, the barrier layer comprises materials used in tie layers. For example, in some embodiments, the barrier layer is a tie layer. In some embodiments, the barrier layer may be configured to maintain adhesion, with sufficient adhesion strength, between the barrier layer and the first adhesive layer and between the barrier layer and the second adhesive layer, while the first adhesive layer may be configured to maintain adhesion, with sufficient adhesion strength, between the barrier layer and the roofing membrane (e.g., the core layer), and while the second adhesive layer may be configured to maintain adhesion, with sufficient adhesion strength, between the barrier layer and the roofing substrate. In some embodiments, maintaining adhesion strength between and among the various layers in this way prevents failure of the adhesive film and, more generally, the roofing system. In some embodiments, the adhesion strength may be a peel strength of at least 2 PLI. In some embodiments, the adhesion strength may be a peel strength of 2 PLI to 15 PLI, or any range or subrange therebetween.

In some embodiments, the barrier layer may be any suitable material known to those skilled in the art that may be configured to reinforce the first layer and the second layer. In some embodiments, the barrier layer may be any suitable material known to those skilled in the art that may be configured to maintain separation between the first layer and the second layer. For example, in some embodiments, the barrier layer of the adhesive film may comprise at least one of a thermoplastic polyolefin (TPO), a polyethylene terephthalate (PET), a polypropylene (PP), a PET fabric reinforcement, or any combination thereof. In addition, in some embodiments, the barrier layer is configured to prevent migration of at least a plasticizer from the roofing membrane to the second adhesive layer. In some embodiments, the barrier layer may include a material that may be configured to prevent migration of a plasticizer from the roofing membrane, which may include, but is not limited to, polyurethane. In some embodiments, the barrier layer may be a polyurethane barrier layer.

In some embodiments, the adhesive film may include more than three layers. For example, in some embodiments, the adhesive film may include a layer that may be positioned between the first layer and the barrier layer; and/or in some embodiments, the adhesive film may include a layer that may be positioned between the second layer and the barrier layer. In some embodiments, these additional layers may be tie layers that may facilitate adhesion of the first, second, and barrier layers to one another.

In some embodiments, the adhesive film does not comprise an adhesion-assisting layer. In some embodiments, an adhesion-assisting layer may refer to any layer useful for aiding in adhesion of a roofing membrane to a roofing substrate. In some embodiments, the adhesion-assisting layer is a layer that does not comprise adhesive. In some embodiments, the adhesion-assisting layer may comprise, consist of, or consist essentially of at least one of a fleece material, a texturing layer, a solvent-treated layer, or any combination thereof.

In some embodiments, the adhesive film may comprise a protective cover or a liner that may be removably attached to the second layer of the adhesive film. In some embodiments, the protective cover or liner may comprise any suitable material known to those skilled in the art that may be configured to be attached to the second layer and removed from the second layer without affecting the adhesive properties of the second layer.

In some embodiments, the one or more adhesives included in the one or more adhesive layers may comprise, consist of, or consist essentially of, or may be selected from the group consisting of, at least one of an epoxy adhesive, a polyurethane adhesive, an acrylic adhesive, an ultraviolet radiation cured adhesive, a silicone-containing adhesive, a silyl modified polymer, a silane terminated polymer, natural rubber, a polyolefin polymer, a poly-alpha-olefin (APAO/APO) polymer, a polyamide polyvinyl acetate, a polyvinyl alcohol, an ethylene vinyl acetate, a styrene, a styrene-isoprene-styrene polymer (SIS), a styrene-butadiene-styrene polymer (SBS), a styrene-ethylene/butylene-styrene polymer (SEBS), a styrene-butadiene rubber (SBR), a polyamide, a polyester, a polyester amide, an ethylene acrylic, a butyl rubber, or any combination thereof.

In some embodiments, the at least one adhesive may comprise, consist of, or consist essentially of a silyl modified polymer. As used herein, the term "silyl modified polymer" may refer to any organic polymer that has been substituted with at least one silyl group. In some embodiments, a silyl modified polymer is a silyl terminated polymer. As used herein, the term "silyl terminated polymer" may refer to a silyl modified polymer where the substitution of the at least one silyl group is at an end of a chain of the polymer backbone.

In some embodiments, a silyl group has the general formula —$Si_nR_{2n+2}$, where R is hydrogen, an organic group, or any combination thereof. As used herein, a "silyl group" may also include any version of the aforementioned formula where at least one of the R sub-groups is substituted with an organic group. In some embodiments, the at least one silyl group is unsubstituted, such that all of the R sub-groups may be the same. In some embodiments, the at least one silyl group is substituted such that some of the R sub-groups may be the same while others may differ from each other. In some embodiments, the at least one silyl group is substituted such that all of the R sub-groups are different.

In some embodiments, the at least one silyl group is a trimethoxysilyl group, a triethoxysilyl group, a tris(2-propenyloxy)silyl group, a triacetoxysilyl group, a methyldimethoxysilyl group, methyldiethoxysilyl group, a dimethoxyethyl silyl group, a (chloromethyl)dimethoxysilyl group, chloromethyl)diethoxysilyl group, a (methoxymethyl)dimethoxysilyl group, a (methoxymethyl)diethoxysilyl group, a (N,N-diethylaminomethyl)dimethoxysilyl group, a (N,N-diethylaminomethyl)diethoxysilyl group, or any combination thereof.

In some embodiments, the at least one silyl group is a hydrolyzable silyl group. As used herein, a "hydrolyzable silyl group" is a silyl group that includes at least one substituent R sub-group where, upon curing using a sufficient amount of moisture, the at least one substituent R sub-group undergoes hydrolysis, so as to form a bond with at least one surface (such as, but not limited to, at least one surface of a roofing membrane). Non-limiting examples of at least one substituent R-sub-group that may be present in a hydrolyzable silyl group include: at least one hydrogen, at least one halide, at least one alkoxy group, at least one acyloxy group, at least one ketoximate group, at least one amino group, at least one amide group, at least one aminooxy, at least one mercapto group, at least one alkenyloxy group at least one alkoxy group (such as, but not limited to, at least one methoxy group, at least one ethoxy group, at least one propoxy group, or at least one isopropoxy group), or any combination thereof.

In some embodiments, the at least one silyl modified polymer may be characterized by a specific polymer backbone. For instance, in some non-limiting embodiments, the at least one silyl modified polymer has a saturated hydrocarbon polymer backbone, a (meth)acrylic acid ester polymer backbone, or a polyoxyalkylene polymer backbone. In some embodiments, the polyoxyalkylene polymer backbone is a polyurethane backbone. In some embodiments the polyoxyalkylene polymer backbone is a polyether backbone. Commercially available examples of asilyl modified polymer with a polyether backbone include, but are not limited to KANEKA MS POLYMER® S327, KANEKA MS POLYMER® S227, KANEKA MS POLYMER® S203H, and GENIOSIL® STP-E35. More specifically, GENIOSIL® STP-E35, is a non-limiting example of a trimethoxysilyl-propylcarbamate-terminated polyether. In some embodiments, the polyoxyalkylene polymer backbone may also be a polyoxyethylene backbone, a polyoxypropylene backbone, a polyoxybutylene backbone, a polyoxytetramethylene backbone, a polyoxyethylene-polyoxypropylene copolymer backbone, a polyoxypropylene-polyoxybutylene copolymer backbone, or any combination thereof.

In some embodiments, the at least one silyl modified polymer is a plurality of silyl modified polymers. In some embodiments, the plurality of silyl modified polymers is at least two silyl modified polymers. In some embodiments, the plurality of silyl modified polymers is at least three silyl modified polymers. In some embodiments, the plurality of silyl modified polymers is at least four silyl modified polymers. In some embodiments, the plurality of silyl modified polymers is at least five silyl modified polymers. In some embodiments, the plurality of silyl modified polymers is at least ten silyl modified polymers. In some embodiments, the plurality of silyl modified polymers is at least twenty silyl modified polymers. In some embodiments, each silyl modified polymer of the plurality of silyl modified polymers is the same. In some embodiments, each silyl modified polymer of the plurality of silyl modified polymers is different. In some embodiments, some silyl modified polymers of the plurality of silyl modified polymers are the same while others are different.

In some embodiments, the adhesive film may comprise, consist of, or consist essentially of a silane terminated polymer. As used herein, the term "silane" may refer to any compound having the general formula $Si_nR_{2n+2}$, where R is hydrogen, an organic group, or any combination thereof. As used herein, the term "silane" may also include any version of the aforementioned formula where at least one of the R groups is substituted with an organic group. In some embodiments, the silane is unsubstituted, such that all of the R groups may be the same. In some embodiments, the silane is substituted such that some of the R groups may be the same while others may differ from each other. In some embodiments, the silane is substituted such that all of the R groups are different. Examples of at least one substituent R group may include, but is not limited to at least one amino group (in the non-limiting case of an aminosilane) and at least one methoxy group (in the non-limiting case of a methoxysilane). In some embodiments, a silane may also encompass a bipodal silane. As used herein, the term "bipodal silane" is a silane having the general formula $R_3Si-R-SiR_3$.

In some embodiments, the silane comprises or is selected from the group consisting of an associative silane, a non-associative silane, or any combination thereof. In some embodiments, the silane comprises, consists, or consists essentially of an associative silane. As used herein, the term "associative silane" may refer to a silane having the general formula $Si(R_1)_n(R_2)_{n+2}$; where each $R_1$ group is a crosslinkable functional group, such as but not limited to, an alkoxy group, acetoxy group, or an oxime group; and where at least one of the $R_2$ groups is a functional group that interacts with another $R_2$ group, interacts with another component in a given roofing putty formulation, or any combination thereof. In some embodiments, the interaction occurs by an interaction mechanism, such as but not limited to, hydrogen bonding, electrostatic attraction, $\pi$-$\pi$ stacking, or any combination thereof. In some embodiments, the silane comprises, consists, or consists essentially of a non-associative silane. As used herein, the term "non-associative silane" may refer to any silane that is not an "associative silane."

In some embodiments, the associative silane comprises or is selected from the group consisting of an epoxysilane, an aminosilane, a diphenylsilane, or any combination thereof. In some embodiments, the associative silane may comprise, consist of, or consist essentially of, or may be selected from the group consisting of, at least one of methacryloxypropyltrimethoxysilane, mercaptopropyltrimethoxysilane methacryloxypropylmethyldimethoxysilane, diphenyldimethoxysilane, an epoxy silane oligomer, glycidoxypropyltrimethoxysilane, aminoethylaminopropyltrimethoxysilane, octylsilane, octyltrimethoxysilane, vinyltrimethoxysilane, or any combination thereof.

In some embodiments, the roofing substrate may comprise, consist of, or consist essentially of at least one of silicone, plywood, cement, concrete, asphaltic shingles, compressed fiberboard, gypsum, oriented strand board, concrete masonry units, masonry blocks, bricks, polyiso foam, polyisocyanurate, steel, aluminum, copper, minerals, limestone, thermoplastic polyolefin, polyvinyl chloride, silicone, polyvinylidene fluoride, polymethyl methacrylate, acrylic, or any combination thereof. In some embodiments, the roofing substrate may comprise, consist of, or consist essentially of at least one of a plywood substrate, a glass substrate, a cellulosic substrate, a polymeric substrate, a mat (e.g., a glass mat, a fiberglass mat, an asphalt-coated fiberglass mat, etc.), a fabric, an underlayment, a roof deck, a photovoltaic (PV) panel, a modified bitumen (MODBIT) substrate, a roll good, a board (such as but not limited to at least one of a foam board (e.g., a polyisocyanurate (ISO) foam board), a cover board, or any combination thereof), a pipe, a base sheet, a chimney, a wax paper, or any combination thereof. In some embodiments, the roofing substrate may comprise, consist of, or consist essentially of at least one of an insulation board, a cover board, a gypsum board, a polyisocyanurate foam board, a fiberglass mat, an asphalt-coated fiberglass mat, a roof deck, or any combination thereof. In some embodiments, the roofing substrate may comprise, consist of, or consist essentially of at least one of a cover board, a mat, or any combination thereof.

In some embodiments, the roofing substrate may comprise, consist of, or consist essentially of at least one low slope roofing substrate. As used herein, the term "low slope roofing substrate" may refer to any roofing substrate that is disposed on a roof having a pitch of Y/X, where Y and X are a ratio of 1:12 to 3:12, where Y corresponds to the "rise" of the roof, and where X corresponds to the "run" of the roof. In some embodiments, Y and X are in a ratio of less than 4:12. In some embodiments, Y and X are in a ratio of less than 3:12. In some embodiments, Y and X are in a ratio of less than 2:12. In some embodiments, Y and X are in a ratio of less than 1:12. In some embodiments, Y and X are in a ratio of 1:12 to 3:12. In some embodiments, Y and X are in a ratio of 1:12 to 2:12. In some embodiments, Y and X are in a ratio of 2:12 to 3:12.

In some embodiments, the roofing substrate may comprise, consist of, or consist essentially of at least one steep slope roofing substrate. As used herein, the term "steep slope roofing substrate" may refer to any roofing substrate that is disposed on a roof having a pitch of Y/X, where Y and X are a ratio of 4:12 to 12:12, where Y corresponds to the "rise" of the roof, and where X corresponds to the "run" of the roof. In some embodiments, Y and X are in a ratio of 5:12 to 12:12. In some embodiments, Y and X are in a ratio of 6:12 to 12:12. In some embodiments, Y and X are in a ratio of 8:12 to 12:12. In some embodiments, Y and X are in a ratio of 9:12 to 12:12. In some embodiments, Y and X are in a ratio of 10:12 to 12:12. In some embodiments, Y and X are in a ratio of 11:12 to 12:12. In some embodiments, Y and X are in a ratio of 4:12 to 11:12. In some embodiments, Y and X are in a ratio of 4:12 to 10:12. In some embodiments, Y and X are in a ratio of 4:12 to 9:12. In some embodiments, Y and X are in a ratio of 4:12 to 8:12. In some embodiments, Y and X are in a ratio of 4:12 to 7:12. In some embodiments, Y and X are in a ratio of 4:12 to 6:12. In some embodiments, Y and X are in a ratio of 4:12 to 5:12. In some embodiments, Y and X are in a ratio of 5:12 to 11:12. In some embodiments, Y and X are in a ratio of 6:12 to 10:12. In some embodiments, Y and X are in a ratio of 7:12 to 9:12.

In some embodiments, the roofing substrate may be secured to a structure. In some embodiments, the roofing substrate may be configured to be secured to a structure. As used herein, the term "structure" is not particularly limited and may include, for example and without limitation, any roof deck of any construction. In some embodiments, the structure may form or may be a part of a residential building. In some embodiments, the structure may form or may be a part of a commercial building.

In some embodiments, a roofing system may comprise, consist of, or consist essentially of a roofing membrane comprising a cap, a scrim, and a core; and an adhesive film comprising a first adhesive layer adhered to the roofing membrane, a second adhesive layer configured to adhere the roofing membrane to a roofing substrate, and a barrier layer positioned between the first and second adhesive layers.

In some embodiments, the first adhesive layer of the adhesive film is different from the second adhesive layer of the adhesive film.

In some embodiments, the roofing membrane comprises thermoplastic polyolefin (TPO).

In some embodiments, the roofing membrane comprises polyvinyl chloride (PVC).

In some embodiments, the barrier layer of the adhesive film comprises TPO, Polyethylene Terephthalate (PET), Polypropylene (PP), or PET fabric reinforcement.

In some embodiments, the barrier layer of the adhesive film is configured to prevent migration of a plasticizer.

In some embodiments, the barrier layer of the adhesive film comprises polyurethane.

In some embodiments, the barrier layer of the adhesive film is a polyurethane barrier layer.

In some embodiments, the adhesive film further comprises a fourth layer positioned between the first adhesive layer and the barrier layer and a fifth layer positioned between the second adhesive layer and the barrier layer.

In some embodiments, the adhesive film includes a liner removably attached to the second adhesive layer of the adhesive film.

In some embodiments, the first adhesive layer and the second adhesive layer are not liquid adhesives.

In some embodiments, the roofing membrane is a singly ply TPO roofing membrane.

In some embodiments, the roofing membrane is a single ply PVC roofing membrane.

In some embodiments, the first adhesive layer comprises non-polar adhesive materials such as polyolefin polymer, poly-alpha-olefin (APAO/APO) polymer, Butyl rubber, a styrene-isoprene-styrene polymer (SIS), a styrene-butadiene-styrene polymer (SBS), a styrene-ethylene/butylene-styrene polymer (SEBS), and/or a styrene-butadiene rubber (SBR).

In some embodiments, the first adhesive layer comprises acrylic, polyurethane, and/or silane terminated polymer.

In some embodiments, the second adhesive layer comprises polar adhesives such as ethylene vinyl acetate, poly vinyl acetate, or acrylic adhesives.

In some embodiments, the first adhesive layer has a thickness between approximately 1 mil and 10 mils, between approximately 2 mil and 9 mil, between approximately, 3 mil and 8 mil, between approximately 4 mil and 7 mil, between approximately 1 mil and 8 mil, between approximately 1 mil and 5 mil, or between approximately 5 mil and 10 mil.

In some embodiments, the second adhesive layer has a thickness between approximately 1 mil and 10 mil, between approximately 2 mil and 9 mil, between approximately, 3 mil and 8 mil, between approximately 4 mil and 7 mil, between approximately 1 mil and 8 mil, between approximately 1 mil and 5 mil, or between approximately 5 mil and 10 mil.

In some embodiments, a roofing system may include a single ply TPO roofing membrane comprising a cap, a scrim, a core; and an adhesive film, wherein the adhesive film comprising a first adhesive layer adhered to the roofing membrane, a second adhesive layer configured to adhere the roofing membrane to a roofing substrate, and a barrier layer positioned between the first and second adhesive layers.

In some embodiments, the barrier layer of the adhesive film comprises TPO, PET, PP, or PET fabric reinforcement.

In some embodiments, the first adhesive layer is different from the second adhesive layer.

In some embodiments, the first adhesive layer and the second adhesive layer are not liquid adhesives.

In some embodiments, the first adhesive layer comprises non-polar adhesive materials such as polyolefin polymer, poly-alpha-olefin (APAO/APO) polymer, Butyl, SIS, SBS, SEBS, and/or SBR, acrylic, polyurethane, and/or silane terminated polymer.

In some embodiments, the second adhesive layer comprises polar adhesives such as ethylene vinyl acetate, poly vinyl acetate, or acrylic adhesives.

In some embodiments, the first adhesive layer has a thickness between approximately 1 mil and 10 mil, between approximately 2 mil and 9 mil, between approximately, 3 mil and 8 mil, between approximately 4 mil and 7 mil, between approximately 1 mil and 8 mil, between approximately 1 mil and 5 mil, or between approximately 5 mil and 10 mil.

In some embodiments, the second adhesive layer has a thickness between approximately 1 mil and 10 mil, between approximately 2 mil and 9 mil, between approximately, 3 mil and 8 mil, between approximately 4 mil and 7 mil, between approximately 1 mil and 8 mil, between approximately 1 mil and 5 mil, or between approximately 5 mil and 10 mil.

In some embodiments, a roofing system may comprise, consist of, or consist essentially of a single ply polyvinyl chloride (PVC) roofing membrane comprising a cap, a scrim, a core; and an adhesive film comprising a first adhesive layer adhered to the roofing membrane, a second adhesive layer configured to adhere the roofing membrane to a roofing substrate, and a barrier layer positioned between the first and second adhesive layers, wherein the barrier layer is configured to prevent migration of a plasticizer.

In some embodiments, the first adhesive layer is different from the second adhesive layer.

In some embodiments, the barrier layer of the adhesive film comprises polyurethane.

In some embodiments, the barrier layer of the adhesive film is a polyurethane barrier layer.

In some embodiments, the adhesive film further comprises a fourth layer positioned between the first adhesive layer and the barrier layer and a fifth layer positioned between the second adhesive layer and the barrier layer.

In some embodiments, the roofing system includes a liner removably attached to the second adhesive film.

In some embodiments, the first adhesive layer and the second adhesive layer are not liquid adhesives.

The roofing system, wherein the first adhesive layer comprises acrylic, polyurethane, and/or silane terminated polymer.

The roofing system, wherein the second adhesive layer comprises polar adhesives such as poly vinyl acetate, ethylene vinyl acetate, or acrylic adhesives.

In some embodiments, the first adhesive layer has a thickness between approximately 1 mil and 10 mil, between approximately 2 mil and 9 mil, between approximately, 3 mil and 8 mil, between approximately 4 mil and 7 mil, between approximately 1 mil and 8 mil, between approximately 1 mil and 5 mil, or between approximately 5 mil and 10 mil.

In some embodiments, the second adhesive layer has a thickness between approximately 1 mil and 10 mil, between approximately 2 mil and 9 mil, between approximately, 3 mil and 8 mil, between approximately 4 mil and 7 mil, between approximately 1 mil and 8 mil, between approximately 1 mil and 5 mil, or between approximately 5 mil and 10 mil.

In some embodiments, a roofing system may include a single ply TPO roofing membrane comprising a cap, a scrim, a core; and an adhesive film, wherein the adhesive film comprising a non-adhesive layer adhered to the roofing membrane, a first adhesive layer adhered to non-adhesive layer, and a second adhesive layer adhered to the first adhesive layer, wherein the second adhesive layer is configured to adhere the roofing membrane to a roofing substrate.

In some embodiments, the non-adhesive layer of the adhesive film comprises TPO, PET, PP, or PET fabric reinforcement.

In some embodiments, the non-adhesive layer of the adhesive film comprises PET.

In some embodiments, the first adhesive layer is different from the second adhesive layer.

In some embodiments, the first adhesive layer and the second adhesive layer are not liquid adhesives.

In some embodiments, the first adhesive layer comprises non-polar adhesive materials such as polyolefin polymer, poly-alpha-olefin (APAO/APO) polymer, Butyl, SIS, SBS, SEBS, and/or SBR, acrylic, polyurethane, and/or silane terminated polymer.

In some embodiments, the second adhesive layer comprises polar adhesives such as ethylene vinyl acetate, poly vinyl acetate, or acrylic adhesives.

In some embodiments, the first adhesive layer has a thickness between approximately 1 mil and 10 mil, between approximately 2 mil and 9 mil, between approximately, 3 mil and 8 mil, between approximately 4 mil and 7 mil, between approximately 1 mil and 8 mil, between approximately 1 mil and 5 mil, or between approximately 5 mil and 10 mil.

In some embodiments, the second adhesive layer has a thickness between approximately 1 mil and 10 mil, between approximately 2 mil and 9 mil, between approximately, 3 mil and 8 mil, between approximately 4 mil and 7 mil, between approximately 1 mil and 8 mil, between approximately 1 mil and 5 mil, or between approximately 5 mil and 10 mil.

Some embodiments of the present disclosure relate to a method of manufacturing a roofing system. In some embodiments, the method of manufacturing the roofing system may include the step of forming, e.g., manufacturing, a roofing membrane. In some embodiments, forming the roofing membrane may include manufacturing a single-ply sheet of material that may be configured to adhere to a roofing substrate. In some embodiments, forming the roofing membrane may include manufacturing a sheet of single-ply synthetic material. In some embodiments, the synthetic material may include EPDM, CSPE, TPO, PVC, or any combinations thereof. In some embodiments, forming the roofing membrane may include manufacturing a sheet of single-ply material that includes one or more layers of material. In some embodiments, the layers of material in the roofing membrane may include a cap layer, a scrim, and a core layer. In some embodiments, forming the roofing membrane may include extruding, co-extruding, laminating, or coating the cap layer on the scrim. In some embodiments, forming the roofing membrane may include extruding, co-extruding, laminating, or coating the core layer on the scrim.

In some embodiments, the method of manufacturing may further include applying an adhesive film to the roofing membrane. The adhesive film may be applied to the roofing membrane using any suitable technique and/or application known to those skilled in the art, including, without limitation, spraying, slot die or roll coating. In some embodiments, the adhesive film may be applied by lamination, extrusion, or co-extrusion to the roofing membrane.

In some embodiments, the roofing system may be manufactured such that one end of the roofing system includes the roofing membrane, and the adhesive film may be located at the opposite end of the roofing system. To prevent damage to the adhesive film following manufacturing of the roofing system, in some embodiments, manufacturing of the roofing system may include applying a protective cover or a liner to the adhesive film. In some embodiments, the roofing system may be manufactured such that upon removal of the protective cover or liner from the adhesive film, the roofing system may be configured to be adhered to a roofing substrate. For example, in some embodiments, the protective cover or liner may be removed by peeling it off of the adhesive film, and the roofing system may be adhered to the roofing substrate by sticking the roofing system, adhesive film-side down, onto the roofing substrate.

In some embodiments, manufacturing the adhesive film may include manufacturing an adhesive film having one or more layers. For example, in some embodiments, the adhesive film may include at least three layers, including a first layer, a second layer and a barrier layer. In some embodiments, the adhesive film may be manufactured by lamination, extrusion, co-extrusion, coating, or any combination thereof.

In some embodiments the first layer of the adhesive film may be a first adhesive layer. In some embodiments, the method of manufacturing may include adhering the first adhesive layer roofing membrane. In some embodiments, the first adhesive layer may be adhered to the roofing membrane by laminating the adhesive film to the roofing membrane. In some embodiments, the first adhesive layer may be adhered to the roofing membrane by co-extrusion, extrusion, or coating the adhesive film onto the roofing membrane. In some embodiments, a strength of the adhesion between the first adhesive layer and the roofing membrane may be greater than 2 PLI 180° peel when tested at 2"/min pulling speed in accordance with ASTM D413.

In some embodiments, the first adhesive layer may include non-polar adhesive materials such as polyolefin polymer, poly-alpha-olefin (APAO/APO) polymer, Butyl, SIS, SBS, SEBS, SBR, or any combinations thereof.

In some embodiments, the first adhesive layer may also include acrylic, polyurethane, silane terminated polymer, or any combinations thereof. In some embodiments, the first adhesive layer is not a liquid adhesive.

In some embodiments, the first adhesive layer may be manufactured to have a thickness between approximately 1 mil and 10 mil. In some embodiments, the first adhesive layer may be manufactured to have a thickness between approximately 2 mil and 9 mil. In some embodiments, the first adhesive layer may be manufactured to have a thickness between approximately, 3 mil and 8 mil. In some embodiments, the first adhesive layer may be manufactured to have a thickness between approximately 4 mil and 7 mil. In some embodiments, the first adhesive layer may be manufactured to have a thickness between approximately 1 mil and 8 mil. In some embodiments, the first adhesive layer may be manufactured to have a thickness between approximately 1 mil and 5 mil. In some embodiments, the first adhesive layer may be manufactured to have a thickness between approximately 5 mil and 10 mil.

In some embodiments the second layer of the adhesive film may be a second adhesive layer, which may be configured to adhere the roofing membrane to a roofing substrate. In some embodiments, a strength of the adhesion between the second adhesive layer and the roofing substrate may be greater than 2 PLI 180° peel when tested at 2"/min pulling speed in accordance with ASTM D413. In some embodiments, the second adhesive layer may be made of one or more materials that are different from the first adhesive layer. For example, in some embodiments, the second adhesive layer may include polar adhesives such as ethylene vinyl acetate, acrylic adhesives, or any combinations thereof. In some embodiments, the second adhesive layer is not a liquid adhesive.

In some embodiments, the second adhesive layer may be manufactured to have a thickness between approximately 1 mil and 10 mil. In some embodiments, the second adhesive layer may be manufactured to have a thickness between approximately 2 mil and 9 mil. In some embodiments, the second adhesive layer may be manufactured to have a thickness between approximately, 3 mil and 8 mil. In some embodiments, the second adhesive layer may be manufactured to have a thickness between approximately 4 mil and 7 mil. In some embodiments, the second adhesive layer may be manufactured to have a thickness between approximately 1 mil and 8 mil. In some embodiments, the second adhesive layer may be manufactured to have a thickness between approximately 1 mil and 5 mil. In some embodiments, the second adhesive layer may be manufactured to have a thickness between approximately 5 mil and 10 mil.

In some embodiments, manufacturing the roofing system may include positioning the barrier layer of the adhesive film between the roofing membrane and the first layer. In some embodiments, manufacturing the roofing system may include positioning the barrier layer of the adhesive film between the first and second layers. In some embodiments, the barrier layer of the adhesive film may be a non-adhesive layer. The barrier layer may include any suitable material known to those skilled in the art that may facilitate adhering of the adhesive film to both a roofing membrane and a roofing substrate. In some embodiments, the barrier layer may also be any suitable material known to those skilled in the art that may be configured to reinforce the first layer and the second layer. In some embodiments, the barrier layer may be any suitable material known to those skilled in the art that may be configured to maintain separation between the first layer and the second layer. For example, in some embodiments, the barrier layer of the adhesive film may include TPO, PET, PP, PET fabric reinforcement, or combinations thereof. In addition, in some embodiments, the barrier layer may include a material that may be configured to prevent migration of a plasticizer from the roofing membrane, which may include, but is not limited to, polyurethane. In some embodiments, the barrier layer may be a polyurethane barrier layer.

In some embodiments, manufacturing the roofing system may comprise one or more of the following steps: obtaining a scrim, obtaining a core precursor formulation, obtaining a cap precursor formulation, obtaining an adhesive film, extruding the core precursor formulation to form an extruded core layer on the scrim, extruding the cap precursor formulation to form an extruded cap layer on the scrim, and adhering the adhesive film to the extruded core layer to obtain a roofing system. In some embodiments, the method further comprises at least one of adhering the extruded core layer to a bottom surface of the scrim, adhering the extruded cap layer to a top surface of the scrim, adhering a protective liner to the second adhesive layer of the adhesive film, or any combination thereof. In some embodiments, the adhering comprises laminating. In some embodiments, the adhering comprises bonding.

In some embodiments, the scrim may comprise a top surface and a bottom surface.

In some embodiments, each of the cap precursor formulation and the core precursor formulation may independently comprise, consist of, or consist essentially of at least one of at least one of thermoplastic polyolefins (TPO), polyvinyl chlorides (PVC), cyclopiazonic acid (CPA), chlorinated polyethylene resins (CPE), ethylene interpolymers (EIP), nitrile butadiene polymers (NBP), polyisobutylenes (PIB), atactic-polypropylene (APP), APP-modified bitumen, poly (styrene-butadiene-styrene) (SBS), styrene ethylene butylene styrene (SEBS), ethylene propylene diene monomers (EDPM), chlorosulfonated polyethylene rubbers (CSPE), polychloroprene (CR), extracellular region membranes (ECR), polycarbonate, nylon, polyvinyl acetate, polystyrene, polytetrafluoroethylene, polyvinylidene fluoride (PVDF), polyurethane, epoxy, any precursor thereof, or any combination thereof.

In some embodiments, the roofing system is manufactured in a single-pass continuous process in which the core precursor formulation is extruded (e.g., through an extrusion die, among other things) to form the extruded core layer, and the cap precursor formulation is extruded (e.g., through an extrusion die, among other things) to form the extruded cap layer. In some embodiments, the extruded cap layer and the extruded core layer, together with the scrim and adhesive film, may be supplied to one or more pairs of calendaring rolls, one or more pairs of laminating wheels, or any combination thereof to form the roofing system.

In some embodiments, the single-pass continuous process may comprise a single process stage in which the extruded core layer is adhered to the scrim, and concurrently the extruded cap layer is adhered to the scrim, and concurrently the adhesive film is adhered to the extruded core layer while the extruded core layer and the extruded cap layer are being adhered to the scrim.

In some embodiments, the single-pass continuous process may comprise a first process stage in which the extruded core layer is adhered to the scrim to form a core layer-scrim intermediate product. In some embodiments, the single-pass continuous process may comprise a second process stage in which the extruded cap layer is adhered to a top surface of the core layer-scrim intermediate product and, concurrently, the adhesive film is laminated to a bottom surface of the core layer-scrim intermediate product to form the roofing system.

In some embodiments, the single-pass continuous process may comprise a three-stage process in which each stage of the process is sequentially performed. In some embodiments, a first process stage is performed in which the extruded core layer is adhered to the scrim. In some embodiments, a second process stage is performed in which the extruded cap layer is adhered to the scrim. In some embodiments, a third process stage is performed in which the adhesive film is laminated to the extruded core layer. In some embodiments, the first process stage, the second process stage, and third process stage may be performed in any order. For example, in some embodiments, the single-pass continuous process comprises performing the process stages in the order of the first process stage, the second process stage, and the third process stage. In some embodiments, the single-pass continuous process comprises performing the process stages in the order of the second process stage, the first process stage, and the third process stage. In some embodiments, the single-pass continuous process comprises performing the process stages in the order of the second process stage, the third process stage, and the first process stage.

In some embodiments, a method of manufacturing a roofing system may include forming a roofing membrane comprising a cap, a scrim, and a core; and applying an adhesive film to the roofing membrane, wherein the adhesive film comprises a first adhesive layer, a second adhesive layer configured to adhere the roofing membrane to a roofing substrate, and a barrier layer positioned between the first and second adhesive layers.

In some embodiments, the adhesive film is applied to the roofing membrane by lamination, extrusion, co-extrusion, or coating.

In some embodiments, the method of manufacturing further comprises applying a removable liner to the second adhesive layer.

In some embodiments, applying the adhesive film to the roofing membrane comprises adhering the first adhesive layer roofing membrane.

In some embodiments, the first adhesive layer is different from the second adhesive layer.

In some embodiments, forming the roofing membrane comprises forming a single ply thermoplastic polyolefin (TPO) roofing membrane.

In some embodiments, forming the roofing membrane comprises forming a single ply polyvinyl chloride (PVC) roofing membrane.

In some embodiments, the barrier layer of the adhesive film comprises TPO, PET, PP, or PET fabric reinforcements.

In some embodiments, the barrier layer of the adhesive film comprises PET.

In some embodiments, the barrier layer of the adhesive film prevents migration of a plasticizer.

In some embodiments, the barrier layer of the adhesive film comprises polyurethane.

In some embodiments, the barrier layer of the adhesive film is a polyurethane barrier layer.

In some embodiments, the adhesive film further comprises a fourth layer positioned between the first adhesive layer and the barrier layer and a fifth layer positioned between the second adhesive layer and the barrier layer.

In some embodiments, the first adhesive layer and the second adhesive layer are not liquid adhesives.

In some embodiments, the first adhesive layer comprises non-polar adhesive materials such as polyolefin polymer, poly-alpha-olefin (APAO/APO) polymer, Butyl, SIS, SBS, SEBS, and/or SBR, acrylic, polyurethane, and/or silane terminated polymer.

In some embodiments, the first adhesive layer comprises non-polar adhesive materials such as polyolefin polymer, poly-alpha-olefin (APAO/APO) polymer, Butyl, SIS, SBS, SEBS, and/or SBR.

In some embodiments, the first adhesive layer comprises acrylic, polyurethane, and/or silane terminated polymer.

In some embodiments, the second adhesive layer comprises polar adhesives such as ethylene vinyl acetate, poly vinyl acetate, or acrylic adhesives.

In some embodiments, the first adhesive layer has a thickness between approximately 1 mil and 10 mil, between approximately 2 mil and 9 mil, between approximately, 3 mil and 8 mil, between approximately 4 mil and 7 mil, between approximately 1 mil and 8 mil, between approximately 1 mil and 5 mil, or between approximately 5 mil and 10 mil.

In some embodiments, the second adhesive layer has a thickness between approximately 1 mil and 10 mil, between approximately 2 mil and 9 mil, between approximately, 3 mil and 8 mil, between approximately 4 mil and 7 mil, between approximately 1 mil and 8 mil, between approximately 1 mil and 5 mil, or between approximately 5 mil and 10 mil.

In some embodiments, a method of manufacturing a roofing system may include forming a roofing membrane comprising a cap, a scrim, and a core; and laminating an adhesive film to the roofing membrane, wherein the adhesive film comprises a non-adhesive layer adhered to the roofing membrane, a first adhesive layer adhered to non-adhesive layer, and a second adhesive layer adhered to the first adhesive layer, wherein the second adhesive layer is configured to adhere the roofing membrane to a roofing substrate.

In some embodiments, the method of manufacturing further comprises applying a removable liner to the second adhesive layer.

In some embodiments, the first adhesive layer is different from the second adhesive layer.

In some embodiments, forming the roofing membrane comprises forming a single ply thermoplastic polyolefin (TPO) roofing membrane.

In some embodiments, the non-adhesive layer of the adhesive film comprises TPO, PET, PP, or PET fabric reinforcements.

In some embodiments, the non-adhesive layer of the adhesive film comprises PET.

In some embodiments, the first adhesive layer and the second adhesive layer are not liquid adhesives.

In some embodiments, the first adhesive layer comprises non-polar adhesive materials such as polyolefin polymer, poly-alpha-olefin (APAO/APO) polymer, Butyl, SIS, SBS, SEBS, and/or SBR, acrylic, polyurethane, and/or silane terminated polymer.

In some embodiments, the first adhesive layer comprises non-polar adhesive materials such as polyolefin polymer, poly-alpha-olefin (APAO/APO) polymer, Butyl, SIS, SBS, SEBS, and/or SBR.

In some embodiments, the second adhesive layer comprises polar adhesives such as ethylene vinyl acetate, poly vinyl acetate, or acrylic adhesives.

In some embodiments, the first adhesive layer has a thickness between approximately 1 mil and 10 mil, between approximately 2 mil and 9 mil, between approximately, 3 mil and 8 mil, between approximately 4 mil and 7 mil, between approximately 1 mil and 8 mil, between approximately 1 mil and 5 mil, or between approximately 5 mil and 10 mil.

In some embodiments, the second adhesive layer has a thickness between approximately 1 mil and 10 mil, between approximately 2 mil and 9 mil, between approximately, 3 mil and 8 mil, between approximately 4 mil and 7 mil, between approximately 1 mil and 8 mil, between approximately 1 mil and 5 mil, or between approximately 5 mil and 10 mil.

In some embodiments, a roofing system is provided. In some embodiments, the roofing system may comprise, consist of, or consist essentially of at least one of a roofing substrate, a roofing membrane, an adhesive film, or any combination thereof. In some embodiments, the roofing membrane may comprise, consist of, or consist essentially of a cap layer, a core layer, and a scrim between the cap layer and the core layer. In some embodiments, the roofing membrane comprises at least one of a polyvinyl chloride (PVC), an ethylene propylene diene monomer (EPDM), a thermoplastic polyolefin (TPO), or any combination thereof. In some embodiments, the adhesive film may comprise, consist of, or consist essentially of a barrier layer, a first adhesive layer, a second adhesive layer, or any combination thereof. In some embodiments, the barrier layer is adhered to the core layer of the roofing membrane. In some embodiments, the barrier layer comprises at least one of a thermoplastic polyolefin (TPO), a polyethylene terephthalate (PET), a polypropylene (PP), a PET fabric reinforcement, a polyurethane, or any combination thereof. In some embodiments, the first adhesive layer is adhered to the roofing substrate. In some embodiments, the second adhesive layer is positioned between the barrier layer and the first adhesive layer. In some embodiments, the second adhesive layer is adhered to the barrier layer. In some embodiments, the second adhesive layer is adhered to the first adhesive layer.

In some embodiments, the barrier layer does not comprise a polar polymer.

In some embodiments, the barrier layer comprises a non-polar polymer.

In some embodiments, the barrier layer comprises at least one of a polyurethane, an acrylic, or any combination thereof.

In some embodiments, at least one of the first adhesive layer, the second adhesive layer, or any combination thereof does not comprise a pressure-sensitive adhesive.

In some embodiments, no layer is positioned between the first adhesive layer and the roofing substrate.

In some embodiments, the roofing system does not comprise an edge treatment between the adhesive film and the roofing substrate.

In some embodiments, the roofing system does not comprise a metal-containing edge treatment between the adhesive film and the roofing substrate.

In some embodiments, the first adhesive layer does not comprise bromobutyl rubber.

In some embodiments, the second adhesive layer does not comprise bromobutyl rubber.

In some embodiments, a roofing membrane is provided. In some embodiments, the roofing membrane may comprise, consist of, or consist essentially of at least one of a cap layer, a core layer, a scrim layer, an adhesive film, or any combination thereof. In some embodiments, the scrim layer is between the cap layer and the core layer. In some embodiments, the roofing membrane may comprise at least one of a polyvinyl chloride (PVC), an ethylene propylene diene monomer (EPDM), a thermoplastic polyolefin (TPO), or any combination thereof. In some embodiments, the adhesive film may comprise, consist of, or consist essentially of at least one of a barrier layer, a first adhesive layer, a second adhesive layer, or any combination thereof. In some embodiments, the barrier layer is adhered to the core layer. In some embodiments, the barrier layer comprises at least one of a thermoplastic polyolefin (TPO), a polyethylene terephthalate (PET), a polypropylene (PP), a PET fabric reinforcement, a polyurethane, or any combination thereof. In some embodiments, the first adhesive layer is configured to be adhered to a roofing substrate. In some embodiments, the second adhesive layer is positioned between the barrier layer and the first adhesive layer. In some embodiments, the second adhesive layer is adhered to the barrier layer. In some embodiments, the second adhesive layer is adhered to the first adhesive layer.

In some embodiments, the barrier layer does not comprise a polar polymer.

In some embodiments, the barrier layer comprises a non-polar polymer.

In some embodiments, the barrier layer comprises at least one of a polyurethane, an acrylic, or any combination thereof.

In some embodiments, at least one of the first adhesive layer, the second adhesive layer, or any combination thereof does not comprise a pressure-sensitive adhesive.

In some embodiments, the first adhesive layer does not comprise bromobutyl rubber.

In some embodiments, the second adhesive layer does not comprise bromobutyl rubber.

In some embodiments, a roofing system is provided. In some embodiments, the roofing system may comprise, consist of, or consist essentially of at least one of a roofing substrate, a roofing membrane, an adhesive film, or any combination thereof. In some embodiments, the roofing membrane may comprise, consist of, or consist essentially of a cap layer, a core layer, and a scrim between the cap layer and the core layer. In some embodiments, the roofing membrane comprises at least one of a polyvinyl chloride (PVC), an ethylene propylene diene monomer (EPDM), a thermoplastic polyolefin (TPO), or any combination thereof. In some embodiments, the adhesive film may comprise, consist of, or consist essentially of a first adhesive layer and a second adhesive layer. In some embodiments, the first adhesive layer is a barrier layer configured to reduce migration of a plasticizer in the roofing membrane. In some embodiments, the first adhesive layer is adhered to the core layer of the roofing membrane. In some embodiments, the first adhesive layer comprises at least one of a polyurethane adhesive, an acrylic adhesive, or any combination thereof. In some embodiments, the second adhesive layer is positioned between the first adhesive layer and the roofing substrate. In some embodiments, the second adhesive layer is adhered to the first adhesive layer. In some embodiments, the second adhesive layer is adhered to the roofing substrate.

In some embodiments, the roofing system further comprises a tie layer between the first adhesive layer and the second adhesive layer.

In some embodiments, the barrier layer does not comprise a polar polymer.

In some embodiments, the barrier layer comprises a non-polar polymer.

In some embodiments, the barrier layer comprises at least one of a polyurethane, an acrylic, or any combination thereof.

In some embodiments, at least one of the first adhesive layer, the second adhesive layer, or any combination thereof does not comprise a pressure-sensitive adhesive.

In some embodiments, no layer is positioned between the first adhesive layer and the roofing substrate.

In some embodiments, the roofing system does not comprise an edge treatment between the adhesive film and the roofing substrate.

In some embodiments, the roofing system does not comprise a metal-containing edge treatment between the adhesive film and the roofing substrate.

In some embodiments, the first adhesive layer does not comprise bromobutyl rubber.

In some embodiments, the second adhesive layer does not comprise bromobutyl rubber.

In some embodiments, a roofing membrane is provided. In some embodiments, the roofing membrane may comprise, consist of, or consist essentially of at least one of a cap layer, a core layer, a scrim layer, an adhesive film, or any combination thereof. In some embodiments, the scrim layer is between the cap layer and the core layer. In some embodiments, the roofing membrane may comprise at least one of a polyvinyl chloride (PVC), an ethylene propylene diene monomer (EPDM), a thermoplastic polyolefin (TPO), or any combination thereof. In some embodiments, the adhesive film may comprise, consist of, or consist essentially of at least one of a first adhesive layer and a second adhesive layer. In some embodiments, the first adhesive layer is a barrier layer configured to reduce migration of a plasticizer in the roofing membrane. In some embodiments, the first adhesive layer is adhered to the core layer of the roofing membrane. In some embodiments, the first adhesive layer comprises at least one of a polyurethane adhesive, an acrylic adhesive, or any combination thereof. In some embodiments, the second adhesive layer is adhered to the first adhesive layer. In some embodiments, the second adhesive layer is configured to be positioned between the first adhesive layer and a roofing substrate.

In some embodiments, the roofing system further comprises a tie layer between the first adhesive layer and the second adhesive layer.

In some embodiments, the barrier layer does not comprise a polar polymer.

In some embodiments, the barrier layer comprises a non-polar polymer.

In some embodiments, the barrier layer comprises at least one of a polyurethane, an acrylic, or any combination thereof.

In some embodiments, at least one of the first adhesive layer, the second adhesive layer, or any combination thereof does not comprise a pressure-sensitive adhesive.

In some embodiments, the first adhesive layer does not comprise bromobutyl rubber.

In some embodiments, the second adhesive layer does not comprise bromobutyl rubber.

The present disclosure will now be described with reference to several non-limiting exemplary embodiments.

FIG. 1 is a cross-sectional view of a roofing system 100, according to some embodiments of the present disclosure. In some embodiments, the roofing system 100 may be a self-adhering roofing membrane. For example, as shown in FIG. 1, the roofing system 100 may include a roofing membrane 102. In some embodiments, the roofing membrane 102 may be a single-ply roofing membrane. In some embodiments, the roofing membrane 102 may be a single-ply TPO roofing membrane. In other embodiments, the roofing membrane 102 may be any of the roofing membranes disclosed herein. In some embodiments, the roofing membrane 102 may include one or more layers 104, 106, 108. As shown in FIG. 1, in some embodiments, the roofing membrane 102 may include at least three layers, the at least three layers comprising a cap layer 104, a scrim 106, and a core layer 108. In some embodiments, the roofing system 100 may further include an adhesive film 110, which may be adhered or bonded to the roofing membrane 102.

Figure 2A:
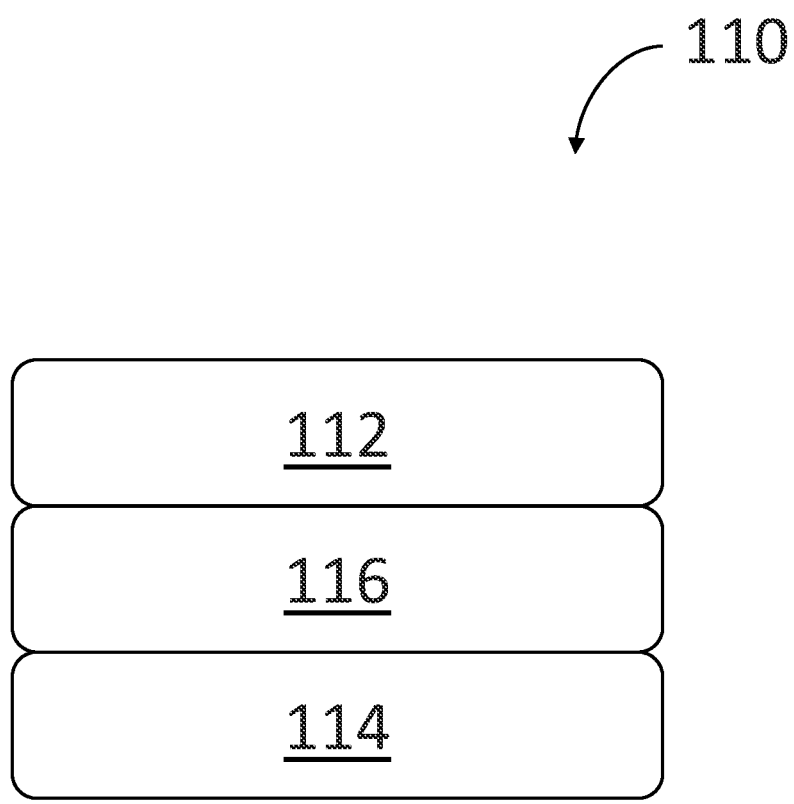
FIG. 2A is a cross-sectional view of an adhesive film of FIG. 1, according to some embodiments of the present disclosure.

FIG. 2A is a cross-sectional view of an adhesive film of FIG. 1, according to some embodiments of the present disclosure. As shown in FIG. 2A, in some embodiments, the adhesive film 110 may include a first layer 112, a second layer 114, and a barrier layer 116. In some embodiments, the barrier layer 116 is a tie layer. The barrier layer 116 may be positioned between the first layer 112 and the second layer 114. The first layer 112 may be a first adhesive layer and the second layer 114 may be a second adhesive layer. The barrier layer 116 may be a non-adhesive layer, which may be formed of TPO, PET, PP, PET fabric reinforcements, or any combination thereof.

The first adhesive layer 112 may be formed of any material that is suitable for adhering to the barrier layer 116 and for adhering to the single-ply TPO roofing membrane 102 (e.g., the core layer 108). For example, in some embodiments, the first adhesive layer 112 may be formed of non-polar adhesive materials such as polyolefin polymer, poly-alpha-olefin (APAO/APO) polymer, Butyl, SIS, SBS, SEBS, SBR, or any combinations thereof. The first adhesive layer 112 may have a thickness between approximately 1 mil and 10 mil.

The second adhesive layer 114 may be formed of any material suitable for adhering to the barrier layer 116 and for adhering the single-ply TPO roofing membrane 102 to a roofing substrate. In some embodiments, the second adhesive layer 114 may be formed a material that is different from the first adhesive layer 112. For example, in some embodiments, the second adhesive layer 114 may be formed polar adhesives such as ethylene vinyl acetate, poly vinyl acetate, acrylic adhesives, or any combinations thereof. The second adhesive layer 114 may have a thickness between approximately 1 mil and 10 mil.

Figure 2B:
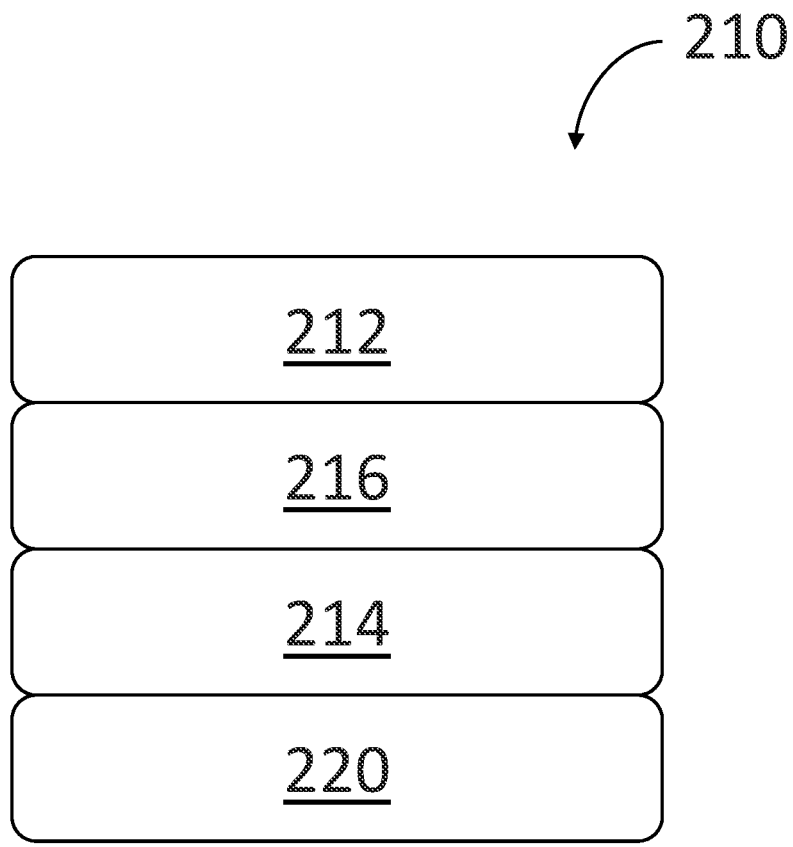
FIG. 2B is a cross-sectional view of an adhesive film of FIG. 1, according to some embodiments of the present disclosure.

FIG. 2B is a cross-sectional view of an adhesive film of FIG. 1, according to some further embodiments of the present disclosure. As shown in FIG. 2B, in some embodiments, the adhesive film 210 may include a first layer 212, a second layer 214, and a barrier layer 216. The barrier layer 216 may be positioned between the first layer 212 and the second layer 214. The first layer 212 may be a first adhesive layer and the second layer 214 may be a second adhesive layer 214. The barrier layer 216 may be a non-adhesive layer, which may be formed of PET.

The first adhesive layer 212 may be formed of any material that is suitable for adhering to the single-ply TPO roofing membrane 102 and to PET. For example, in some embodiments, the first adhesive layer 212 may be formed of non-polar adhesive materials such as polyolefin polymer, poly-alpha-olefin (APAO/APO) polymer, Butyl, SIS, SBS, SEBS, SBR, or any combinations thereof. The first adhesive layer 212 may have a thickness between approximately 1 mil and 10 mil.

The second adhesive layer 214 may be formed of any material suitable for adhering to PET and for adhering the single-ply TPO roofing membrane 102 to a roofing substrate. In some embodiments, the second adhesive layer 214 may be formed of a material that is different from the first adhesive layer 212. For example, in some embodiments, the second adhesive layer 214 may be formed of polar adhesives such as ethylene vinyl acetate, poly vinyl acetate, acrylic adhesives, or any combinations thereof. The second adhesive layer 214 may have a thickness between approximately 1 mil and 10 mil.

As shown in FIG. 2B, the adhesive film 210 may further include a liner or protective cover 220 which may be removably attached to the second layer 214.

Figure 2C:
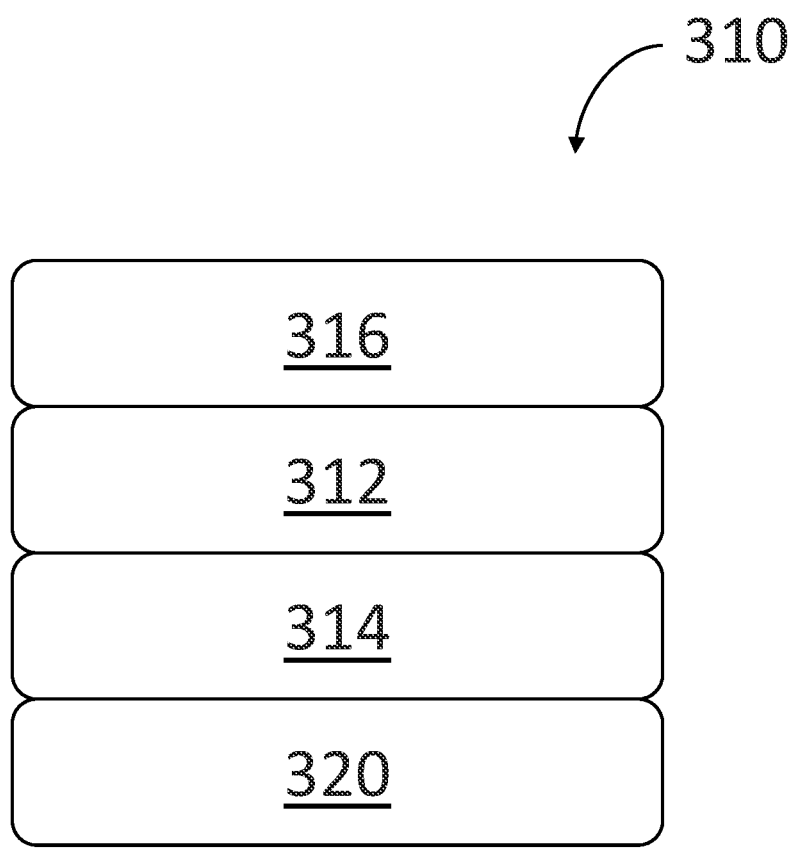
FIG. 2C is a cross-sectional view of an adhesive film of FIG. 1, according to some embodiments of the present disclosure.

FIG. 2C is a cross-sectional view of an adhesive film of FIG. 1, according to some additional embodiments of the present disclosure. As shown in FIG. 2C, in some embodiments, the adhesive film 310 may include a first layer 312, a second layer 314, and a barrier layer 316. The barrier layer 316 may be positioned on top of the first layer 312, such that when the adhesive film 310 is applied to the roofing membrane 102, the barrier layer 316 may be positioned between the roofing membrane 102 and the first layer 312. The first layer 312 may be a first adhesive layer and the second layer 314 may be a second adhesive layer. The barrier layer 316 may be a non-adhesive layer, which may be formed of TPO.

The first adhesive layer 312 may be formed of any material that is suitable for adhering to the barrier layer 316 and the second layer 314. For example, in some embodiments, the first adhesive layer 312 may be formed of non-polar adhesive materials such as polyolefin polymer, poly-alpha-olefin (APAO/APO) polymer, Butyl, SIS, SBS, SEBS, SBR, or any combinations thereof. The first adhesive layer 312 may have a thickness between approximately 1 mil and 10 mil.

The second adhesive layer 314 may be formed of any material suitable for adhering the single-ply TPO roofing membrane 102 to a roofing substrate. In some embodiments, the second adhesive layer 314 may be formed a material that is different from the first adhesive layer 312. For example, in some embodiments, the second adhesive layer 314 may be formed polar adhesives such as ethylene vinyl acetate, poly vinyl acetate, acrylic adhesives, or any combinations thereof. The second adhesive layer 314 may have a thickness between approximately 1 mil and 10 mil.

As shown in FIG. 2C, the adhesive film 310 may further include a liner or protective cover 320 which may be removably attached to the second layer 314.

Figure 3:
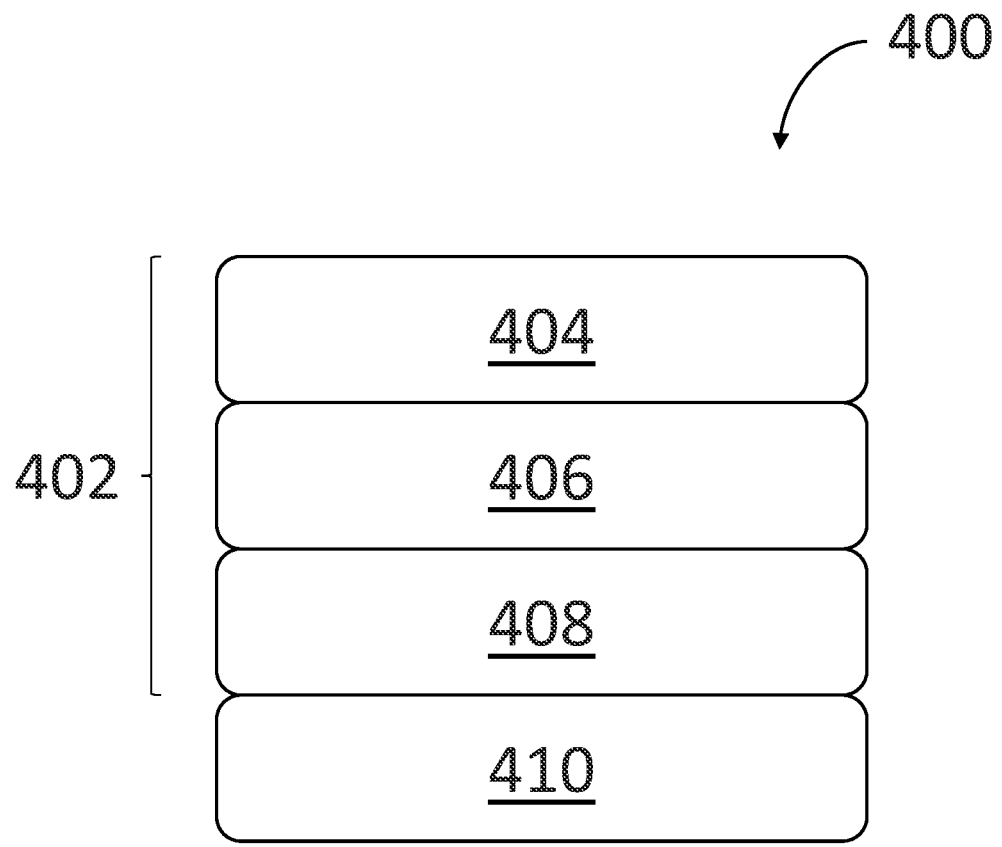
FIG. 3 is a cross-sectional view of a roofing system, according to some embodiments of the present disclosure.

FIG. 3 is a cross-sectional view of a roofing system, according to some embodiments of the present disclosure. As shown in FIG. 3, the exemplary roofing system 400 may include a roofing membrane 402, which may be a single-ply roofing membrane. In the exemplary embodiment of FIG. 3, the roofing membrane 402 may be a single-ply PVC roofing membrane. The exemplary roofing membrane 402 may include one or more layers (404, 406, and 408). For example, as depicted in FIG. 3, the roofing membrane 402 may include at least three layers, which may include a cap layer 404, a scrim 406 and a core layer 408. FIG. 3 further depicts that exemplary roofing system 400 may include an adhesive film 410, which may be adhered to the roofing membrane 402.

Figure 4A:
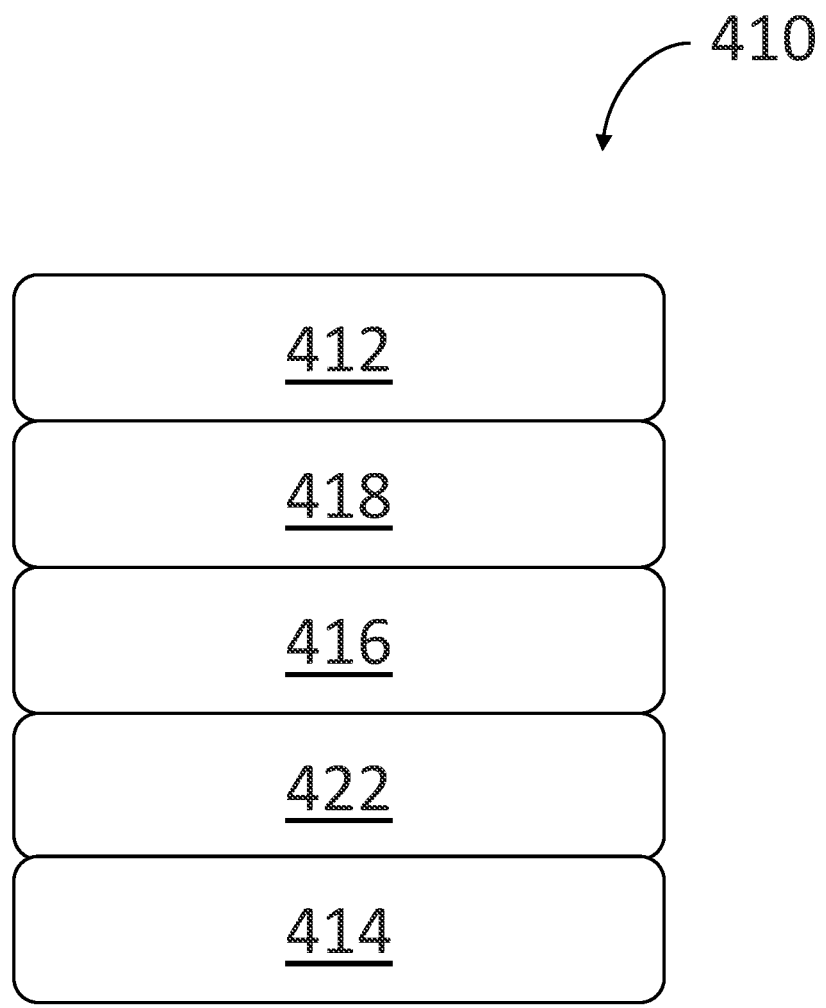
FIG. 4A is a cross-sectional view of an adhesive film of FIG. 3, according to some embodiments of the present disclosure.

FIG. 4A is a cross-sectional view of the adhesive film of FIG. 3, according to some embodiments of the present disclosure. As shown in FIG. 4A, in some embodiments, the adhesive film 410 may include a first layer 412, a second layer 414, and a barrier layer 416. The barrier layer 416 may be positioned between the first and second layers 412, 414. In addition, as depicted in FIG. 4A, in some embodiments, the adhesive film 410 may include a fourth layer 418 positioned between the first layer 412 and the barrier layer 416 and a fifth layer 422 positioned between the second layer 414 and the barrier layer 416.

The first layer 412 of the adhesive film 410 depicted in FIG. 4A may be a first adhesive layer and the second layer 414 may be a second adhesive layer. The first adhesive layer 412 may be formed of any material that is suitable for adhering to the single-ply PVC roofing membrane 402. For example, in some embodiments, the first adhesive layer 412 may be formed of acrylic, polyurethane, silane terminated polymer, or any combinations thereof. The first adhesive layer 412 may have a thickness between approximately 1 mil and 10 mil.

The second adhesive layer 414 may be formed of any material suitable for adhering the single-ply PVC roofing membrane 402 to a roofing substrate. In some embodiments, the second adhesive layer 414 may be formed of a material that is different from the first adhesive layer 412. For example, in some embodiments, the second adhesive layer 414 may be formed of polar adhesives such as ethylene vinyl acetate, poly vinyl acetate, acrylic adhesives, or any combinations thereof. The second adhesive layer 414 may have a thickness between approximately 1 mil and 10 mil.

The barrier layer 416 may be formed of any suitable material known to those skilled in the art that may facilitate adhering of the adhesive film to both a roofing membrane and a roofing substrate. For example, in some embodiments, the barrier layer 416 may be formed of a material that may be configured to prevent migration of a plasticizer from the roofing membrane, which may include, but is not limited to, polyurethane. In some embodiments, the barrier layer 416 may be a polyurethane barrier layer.

The fourth and fifth layers 418, 422, may be tie layers that may be formed of any suitable materials known to those skilled in the art that are configured to facilitate adhesion of the first, second, and barrier layers 412, 414, and 416 to one another. In some embodiments, the fourth layer 418 is a tie layer. In some embodiments, the fifth layer 422 is a tie layer.

Figure 4B:
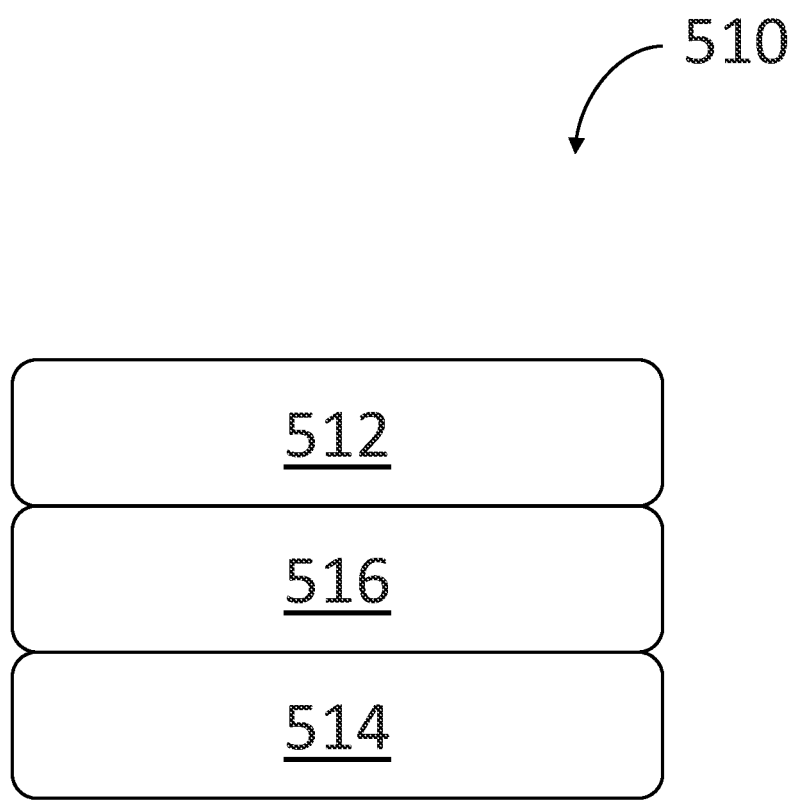
FIG. 4B is a cross-sectional view of an adhesive film of FIG. 3, according to some further embodiments of the present disclosure.

FIG. 4B is a cross-sectional view of the adhesive film of FIG. 3, according to some further embodiments of the present disclosure. As shown in FIG. 4B, in some embodiments, the adhesive film 510 may include a first layer 512, a second layer 514, and a barrier layer 516. The barrier layer 516 may be positioned between the first and second layers 512, 514.

The first layer 512 of the adhesive film 510 depicted in FIG. 4B may be a first adhesive layer and the second layer 514 may be a second adhesive layer. The first adhesive layer 512 may be formed of any material that is suitable for adhering to the single-ply PVC roofing membrane 402. For example, in some embodiments, the first adhesive layer 512 may be formed of acrylic, polyurethane, silane terminated polymer, or any combinations thereof. The first adhesive layer 512 may have a thickness between approximately 1 mil and 10 mil.

The second adhesive layer 514 may be formed of any material suitable for adhering the single-ply PVC roofing membrane 402 to a roofing substrate. In some embodiments, the second adhesive layer 514 may be formed of a material that is different from the first adhesive layer 512. For example, in some embodiments, the second adhesive layer 514 may be formed of polar adhesives such as ethylene vinyl acetate, poly vinyl acetate, acrylic adhesives, or any combinations thereof. The second adhesive layer 514 may have a thickness between approximately 1 mil and 10 mil.

The barrier layer 516 may be formed of any suitable material known to those skilled in the art that may facilitate adhering of the adhesive film to both a roofing membrane and a roofing substrate. For example, in some embodiments, the barrier layer 516 may be formed of a material that may be configured to prevent migration of a plasticizer from the roofing membrane, which may include, but is not limited to, polyurethane. In some embodiments, the barrier layer 516 may be a polyurethane barrier layer.

In some embodiments, the first layer 512 and the barrier layer 516 are combined into a single layer disposed on the second layer 514. In some embodiments, for example, the first layer 512 is useful as an adhesive layer and as a barrier layer, and thus the barrier layer 516 may be omitted. In some of these embodiments, the first layer 512 comprises at least one of an acrylic adhesive, a polyurethane adhesive, or any combination thereof. In some embodiments, the barrier layer 516 is useful as an adhesive layer and as a barrier layer, and thus the first layer 512 may be omitted. In some of these embodiments, the barrier layer 516 comprises at least one of an acrylic adhesive, a polyurethane adhesive, or any combination thereof.

Figure 4C:
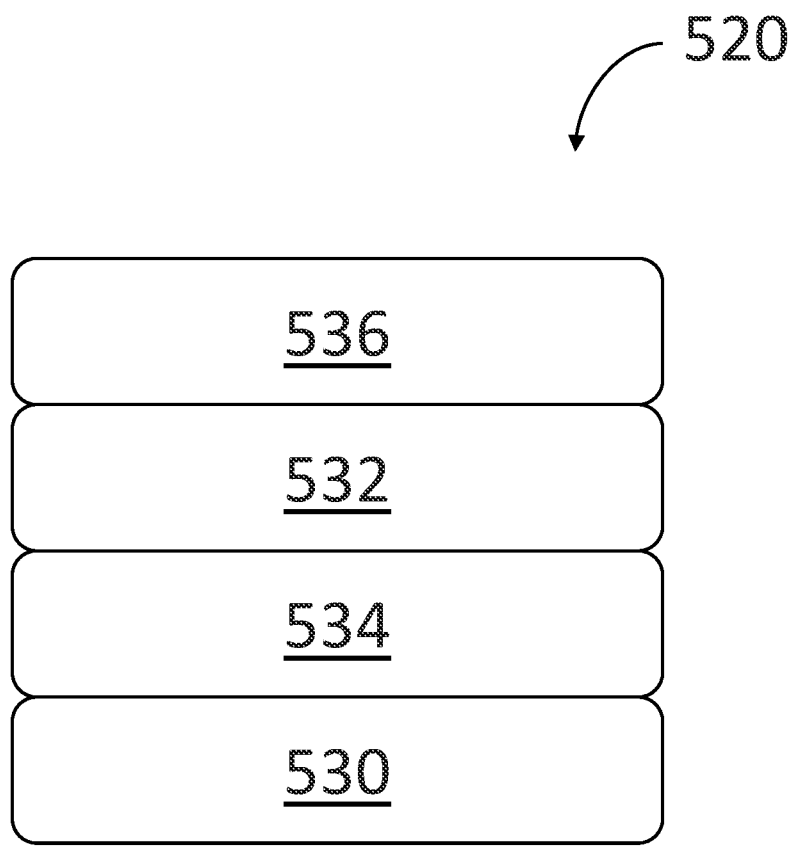
FIG. 4C is a cross-sectional view of an adhesive film of FIG. 3, according to some embodiments of the present disclosure.

FIG. 4C is a cross-sectional view of an adhesive film of FIG. 3, according to some additional embodiments of the present disclosure. As shown in FIG. 4C, in some embodiments, the adhesive film 520 may include a first layer 532, a second layer 534, and a barrier layer 536. The barrier layer 536 may be positioned on top of the first layer 532, such that when the adhesive film 520 is applied to the roofing membrane 402, the barrier layer 536 may be positioned between the roofing membrane 402 and the first layer 532. The first layer 532 may be a first adhesive layer and the second layer 534 may be a second adhesive layer. The barrier layer 536 may be a non-adhesive layer, which may be formed of TPO.

The first adhesive layer 532 may be formed of any material that is suitable for adhering to the barrier layer 536 and the second layer 534. For example, in some embodiments, the first adhesive layer 532 may include an acrylic adhesive, a polyurethane, a silane terminated polymer, or any combination thereof. The first adhesive layer 532 may have a thickness between approximately 1 mil and 10 mil.

The second adhesive layer 534 may be formed of any material suitable for adhering the single-ply PVC roofing membrane 402 to a roofing substrate. In some embodiments, the second adhesive layer 534 may be formed of a material that is different from the first adhesive layer 532. For example, in some embodiments, the second adhesive layer 534 may include ethylene vinyl acetate, poly vinyl acetate, acrylic adhesive, or any combination thereof. The second adhesive layer 534 may have a thickness between approximately 1 mil and 10 mil.

As shown in FIG. 4C, the adhesive film 520 may further include a liner or protective cover 530 which may be removably attached to the second layer 534.

Figure 5:
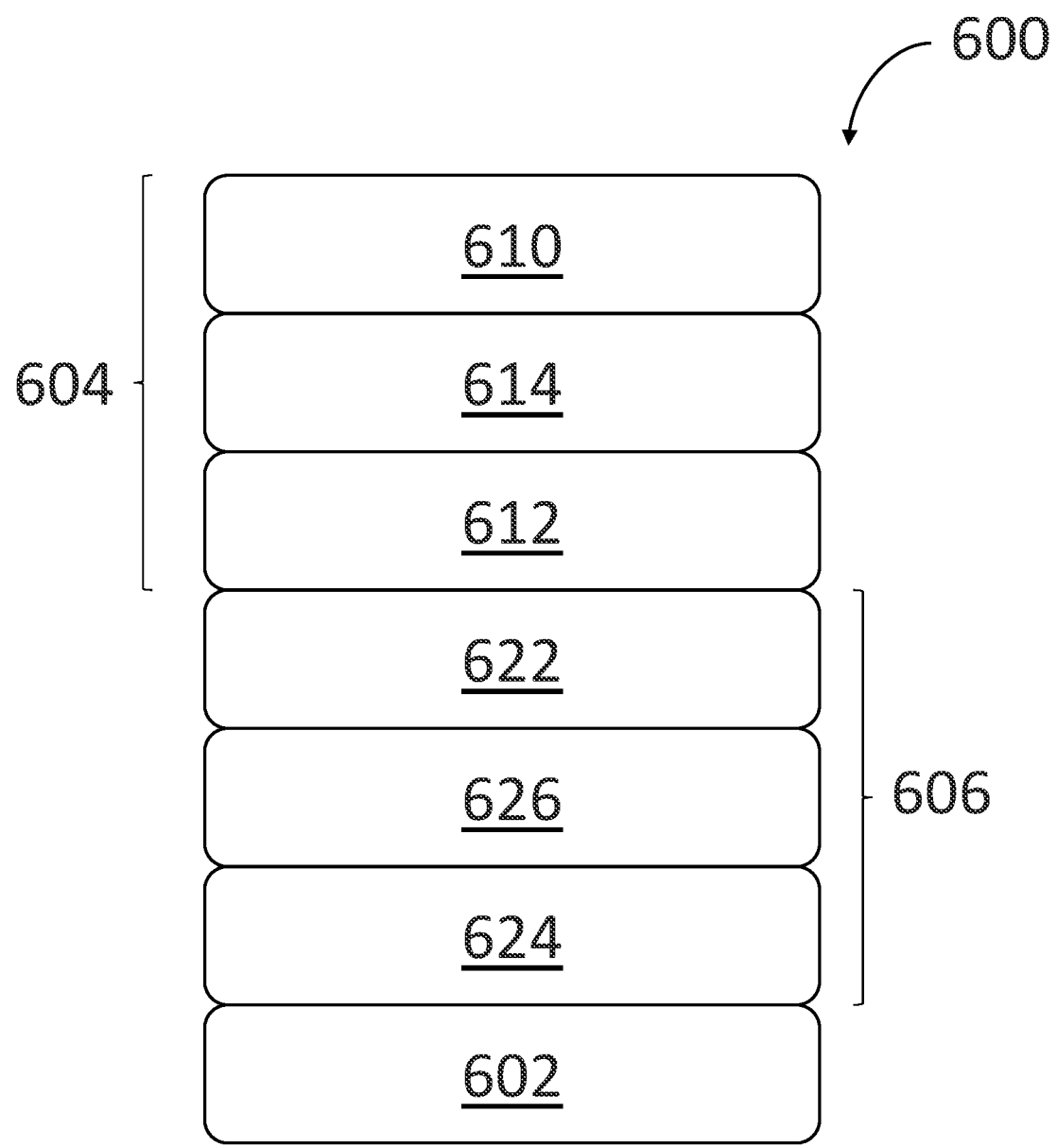
FIG. 5 is a cross-section view of a roofing system, according to some embodiments of the present disclosure.

FIG. 5 is a cross-sectional view of a roofing system, according to some embodiments of the present disclosure. As shown in FIG. 5, the roofing system 600 may comprise a roofing substrate 602, a roofing membrane 604, and an adhesive film 606 between the roofing substrate 602 and the roofing membrane 604. In some embodiments, the roofing membrane 604 may comprise a cap layer 610, a core layer 612, and a scrim 614 between the cap layer 610 and the core layer 612.

In some embodiments, the adhesive film 606 may comprise a first adhesive layer 622, a second adhesive layer 624, and a barrier layer 626 between the first adhesive layer 622 and the second adhesive layer 624. In some embodiments, the first adhesive layer 622 is adhered to the core layer 612 of the roofing membrane 604. In some embodiments, the second adhesive layer 624 is adhered to the roofing substrate 602.

In some embodiments, the adhesive film 606 may comprise a barrier layer 622, a second adhesive layer 624, and a first adhesive layer 626 between the barrier layer 622 and the second adhesive layer 624. In some embodiments, the barrier layer 622 is adhered to the core layer 612 of the roofing membrane 604. In some embodiments, the second adhesive layer 624 is adhered to the roofing substrate 602.

Figure 6:
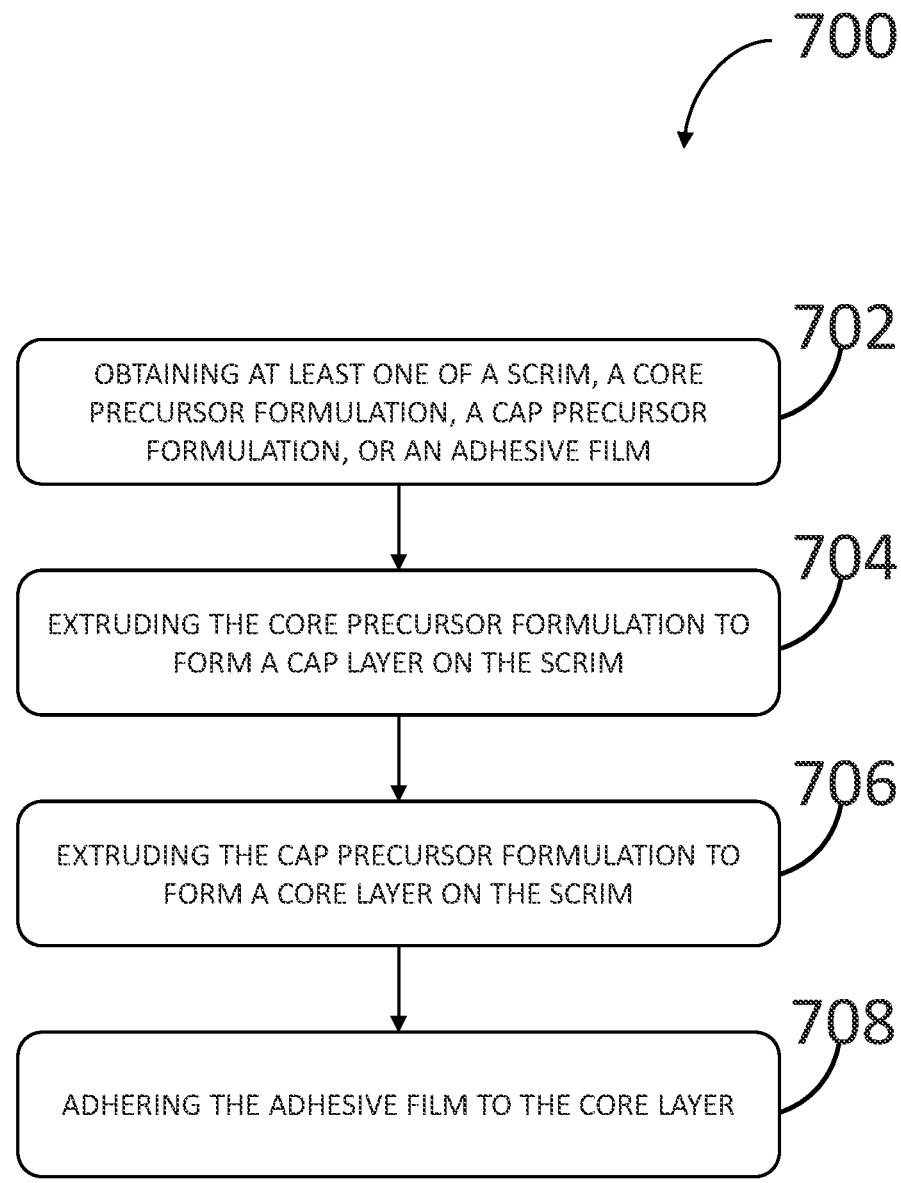
FIG. 6 is a flowchart of a method of manufacturing a roofing system, according to some embodiments of the present disclosure.

FIG. 6 is a flowchart of a method of manufacturing a roofing system, according to some embodiments of the present disclosure. As shown in FIG. 6, the method 700 of manufacturing the roofing system may comprise one or more of the following steps, any one or more of which may be performed concurrently, sequentially, or a combination of concurrently and sequentially: at step 702, obtaining a scrim, obtaining a core precursor formulation, obtaining a cap precursor formulation, obtaining an adhesive film, or any combination thereof; at step 704, extruding the core precursor formulation to form a cap layer on the scrim; at step 706, extruding the cap precursor formulation to form a core layer on the scrim; and, at step 708, adhering the adhesive film to the core layer. In some embodiments, the method further comprises adhering a protective liner to the second adhesive layer of the adhesive film. In some embodiments, the adhering comprises bonding. In some embodiments, the adhering comprises laminating.

Variations, modifications and alterations to embodiments of the present disclosure described above will make themselves apparent to those skilled in the art. All such variations, modifications, alterations and the like are intended to fall within the spirit and scope of the present disclosure, limited solely by the appended claims.

While several embodiments of the present disclosure have been described, it is understood that these embodiments are illustrative only, and not restrictive, and that many modifications may become apparent to those of ordinary skill in the art. For example, all dimensions discussed herein are provided as examples only, and are intended to be illustrative and not restrictive.

Any feature or element that is positively identified in this description may also be specifically excluded as a feature or element of an embodiment of the present as defined in the claims.

The disclosure described herein may be practiced in the absence of any element or elements, limitation or limitations, which is not specifically disclosed herein. Thus, for example, in each instance herein, any of the terms "comprising," "consisting essentially of and "consisting of" may be replaced with either of the other two terms, without altering their respective meanings as defined herein. The terms and expressions which have been employed are used as terms of description and not of limitation, and there is no intention in the use of such terms and expressions of excluding any equivalents of the features shown and described or portions thereof, but it is recognized that various modifications are possible within the scope of the disclosure.

What is claimed is:

1. A roofing system comprising:
a roofing substrate;
a roofing membrane,
wherein the roofing membrane comprises:
a cap layer;
a scrim; and
a core layer,
wherein the scrim is located between the cap layer and the core layer;
wherein the roofing membrane comprises:
a thermoplastic polyolefin (TPO);
a polyvinyl chloride (PVC); or
an ethylene propylene diene monomer (EPDM); and
an adhesive film,
wherein the adhesive film is different from the roofing membrane;
wherein the adhesive film comprises:
a barrier layer,
wherein the barrier layer is different from the roofing membrane;
wherein the barrier layer comprises a polymer through an entire thickness of the barrier layer;
wherein the polymer comprises at least one of a thermoplastic polyolefin (TPO), a polyethylene terephthalate (PET), a polypropylene (PP), a polyurethane, an acrylic, a polyvinyl chloride (PVC), or any combination thereof;
a first layer,
wherein the first layer comprises an adhesive through an entire thickness of the first layer; and
a second layer,
wherein the second layer is different from the first layer;
wherein the second layer comprises an adhesive through an entire thickness of the second layer;
wherein the barrier layer is located between the core layer and the first layer;
wherein the first layer is located between the barrier layer and the second layer;
wherein the second layer is located between the first layer and the roofing substrate;

wherein the barrier layer is directly bonded to the core layer;
wherein the barrier layer is directly adhered to the first layer;
wherein the second layer is directly adhered to the first layer;
wherein the second layer is directly adhered to the roofing substrate.

2. The roofing system of claim 1, wherein the roofing substrate comprises at least one of a roof deck, an underlayment, an insulation board, a cover board, a mat, or any combination thereof.

3. The roofing system of claim 1, wherein the first layer comprises at least one of an epoxy adhesive, a polyurethane adhesive, an acrylic adhesive, an ultraviolet radiation cured adhesive, a silicone-containing adhesive, a butyl adhesive, a silyl modified polymer, a silane terminated polymer, natural rubber, a polyolefin polymer, a poly-alpha-olefin (APAO/APO) polymer, a polyamide polyvinyl acetate, a polyvinyl alcohol, an ethylene vinyl acetate, a styrene, a styrene-isoprene-styrene polymer (SIS), a styrene-butadiene-styrene polymer (SBS), a styrene-ethylene/butylene-styrene polymer (SEBS), a styrene-butadiene rubber (SBR), a polyamide, a polyester, a polyester amide, an ethylene acrylic, a butyl rubber, or any combination thereof.

4. The roofing system of claim 1, wherein the second layer comprises at least one of an ethylene vinyl acetate adhesive, a poly vinyl acetate adhesive, an acrylic adhesive, or any combination thereof.

5. The roofing system of claim 1, wherein a thickness of the first layer is 1 mil to 10 mil.

6. The roofing system of claim 1, wherein a thickness of the second layer is 1 mil to 10 mil.

7. A roofing system comprising:
a roofing substrate;
a roofing membrane,
  wherein the roofing membrane comprises:
    a cap layer,
    a core layer, and
    a scrim between the cap layer and the core layer;
  wherein the roofing membrane comprises:
    a thermoplastic polyolefin (TPO),
    a polyvinyl chloride (PVC), or
    an ethylene propylene diene monomer (EPDM); and
an adhesive film,
  wherein the adhesive film comprises:
    a first layer,
      wherein the first layer is different from the roofing membrane;
      wherein the first layer comprises an adhesive through an entire thickness of the first layer;
    a second layer,
      wherein the second layer is different from the first layer;
      wherein the second layer comprises an adhesive through an entire thickness of the second layer;
    a barrier layer,
      wherein the barrier layer comprises a polymer through an entire thickness of the barrier layer;
      wherein the polymer comprises at least one of a thermoplastic polyolefin (TPO), a polyethylene terephthalate (PET), a polypropylene (PP), a polyurethane, an acrylic, a polyvinyl chloride (PVC), or any combination thereof;
    a third layer,
      wherein the third layer comprises an adhesive through an entire thickness of the third layer; and
    a fourth layer;
      wherein the fourth layer is different from the third layer;
      wherein the fourth layer comprises an adhesive through an entire thickness of the fourth layer;
      wherein the first layer is located between the core layer and the second layer;
      wherein the second layer is located between the first layer and the barrier layer;
      wherein the barrier layer is located between the second layer and the third layer;
      wherein the third layer is located between the barrier layer and the fourth layer;
      wherein the fourth layer is located between the third layer and the roofing substrate;
      wherein the first layer is directly adhered to the core layer of the roofing membrane;
      wherein the second layer is directly adhered to the first layer;
      wherein the barrier layer is directly adhered to the second layer.

8. The roofing system of claim 7, wherein the third layer is directly adhered to the barrier layer.

9. The roofing system of claim 7, wherein the fourth layer is directly adhered to the third layer.

10. The roofing system of claim 7, wherein the fourth layer is directly adhered to the roofing substrate.

11. The roofing system of claim 7, wherein the third layer is different from the second layer.

12. The roofing system of claim 7, wherein the fourth layer is different from the first layer.

13. The roofing system of claim 7, wherein the adhesive film is different from the roofing membrane.

14. The roofing system of claim 7, wherein the roofing substrate comprises at least one of a roof deck, an underlayment, an insulation board, a cover board, a mat, or any combination thereof.

15. The roofing system of claim 7, wherein the first layer comprises at least one of at least one of an epoxy adhesive, a polyurethane adhesive, an acrylic adhesive, a silyl-terminated polymer adhesive, or any combination thereof.

16. The roofing system of claim 7, wherein the second layer comprises at least one of an epoxy adhesive, a polyurethane adhesive, an acrylic adhesive, an ultraviolet radiation cured adhesive, a silicone-containing adhesive, a butyl adhesive, a silyl modified polymer, a silane terminated polymer, natural rubber, a polyolefin polymer, a poly-alpha-olefin (APAO/APO) polymer, a polyamide polyvinyl acetate, a polyvinyl alcohol, an ethylene vinyl acetate, a styrene, a styrene-isoprene-styrene polymer (SIS), a styrene-butadiene-styrene polymer (SBS), a styrene-ethylene/butylene-styrene polymer (SEBS), a styrene-butadiene rubber (SBR), a polyamide, a polyester, a polyester amide, an ethylene acrylic, a butyl rubber, or any combination thereof.

17. The roofing system of claim 7, wherein the barrier layer comprises at least one of thermoplastic polyolefin (TPO), a polyethylene terephthalate (PET), a polypropylene (PP), a polyurethane, an acrylic, a polyvinyl chloride (PVC), or any combination thereof.

18. The roofing system of claim 7, wherein the third layer comprises at least one of an epoxy adhesive, a polyurethane adhesive, an acrylic adhesive, an ultraviolet radiation cured adhesive, a silicone-containing adhesive, a butyl adhesive, a silyl modified polymer, a silane terminated polymer, natural rubber, a polyolefin polymer, a poly-alpha-olefin (APAO/APO) polymer, a polyamide polyvinyl acetate, a polyvinyl alcohol, an ethylene vinyl acetate, a styrene, a styrene-isoprene-styrene polymer (SIS), a styrene-butadiene-styrene polymer (SBS), a styrene-ethylene/butylene-styrene polymer (SEBS), a styrene-butadiene rubber (SBR), a polyamide, a polyester, a polyester amide, an ethylene acrylic, a butyl rubber, or any combination thereof.

19. The roofing system of claim 7, wherein the fourth layer comprises at least one of an ethylene vinyl acetate adhesive, a poly vinyl acetate adhesive, an acrylic adhesive, or any combination thereof.

* * * * *